United States Patent
Magri et al.

(10) Patent No.: US 9,941,963 B2
(45) Date of Patent: Apr. 10, 2018

(54) NON-LINEAR PROPAGATION IMPAIRMENT EQUALIZATION

(71) Applicant: Telefonaktiebolaget LM Ericsson (publ), Stockholm (SE)

(72) Inventors: Roberto Magri, Pisa (IT); Enrico Forestieri, Pisa (IT); Marco Secondini, Pisa (IT); Domenico Marsella, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/309,113

(22) PCT Filed: May 12, 2014

(86) PCT No.: PCT/EP2014/059646
§ 371 (c)(1),
(2) Date: Nov. 4, 2016

(87) PCT Pub. No.: WO2015/172808
PCT Pub. Date: Nov. 19, 2015

(65) Prior Publication Data
US 2017/0078023 A1     Mar. 16, 2017

(51) Int. Cl.
*H04B 10/12* (2006.01)
*H04B 10/2513* (2013.01)
(Continued)

(52) U.S. Cl.
CPC . *H04B 10/25133* (2013.01); *H04B 10/07951* (2013.01); *H04B 10/07955* (2013.01);
(Continued)

(58) Field of Classification Search
CPC .......... H04B 10/25073; H04B 10/2543; H04B 10/6163; H04B 10/6971; H04B 10/2941;
(Continued)

(56) References Cited

U.S. PATENT DOCUMENTS 7,302,192 B2 * 11/2007 Elahmadi ........... H04B 10/2513
398/149
8,285,148 B2 * 10/2012 Haunstein ............. H04B 10/60
398/158
(Continued)

FOREIGN PATENT DOCUMENTS

WO    WO 2013/185845     12/2013

OTHER PUBLICATIONS

A Combined Regular-Logarithmic Perturbation Method for Signal-Noise Interaction in Amplified Optical Systems by Marco Secondini et al.; Journal of Lightwave Technology, vol. 27, No. 16—Aug. 15, 2009.

(Continued)

*Primary Examiner* — Hibret Woldekidan
(74) *Attorney, Agent, or Firm* — Baker Botts, LLP

(57) ABSTRACT

A method (10) of non-linear propagation impairment equalization, the method comprising the steps of: a. receiving (12) communications traffic carried by an optical communications signal transmitted over an optical communications link; b. generating (14) a time dependent filter representation of a nonlinear time-variant impulse response of the inverse of the optical communications link; and c. applying (16) the time dependent filter representation to the received communications traffic to form non-linear propagation impairment equalized communications traffic. An optical communications link nonlinear propagation impairment equalizer and optical communications signal receiver apparatus are also provided.

18 Claims, 14 Drawing Sheets

(51) Int. Cl.
- *H04B 10/2507* (2013.01)
- *H04B 10/2531* (2013.01)
- *H04B 10/079* (2013.01)
- *H04L 25/03* (2006.01)

(52) U.S. Cl.
CPC ... *H04B 10/2531* (2013.01); *H04B 10/25073* (2013.01); *H04L 25/03191* (2013.01)

(58) Field of Classification Search
CPC ........ H04B 10/25133; H04B 10/07951; H04B 10/07955; H04B 10/2531; H04B 10/6161; H04B 10/6165; H04B 10/0795; H04L 25/03019; H04L 25/03891; H04L 25/03191
USPC ............ 398/149, 140, 141, 25, 38, 158, 159
See application file for complete search history.

(56) References Cited

U.S. PATENT DOCUMENTS

| | | | | |
|---|---|---|---|---|
| 8,488,975 | B2* | 7/2013 | Oda | H04B 10/2569 |
| | | | | 398/102 |
| 9,002,210 | B2* | 4/2015 | Lowery | H04B 10/6971 |
| | | | | 398/141 |
| 9,166,703 | B2* | 10/2015 | Secondini | H04L 25/03133 |
| 9,363,014 | B2* | 6/2016 | Oyama | H04B 10/6163 |
| 2006/0140262 | A1* | 6/2006 | Kuijk | H04L 25/03885 |
| | | | | 375/232 |
| 2010/0014873 | A1* | 1/2010 | Bulow | H04B 10/6161 |
| | | | | 398/159 |
| 2015/0071656 | A1* | 3/2015 | Oyama | H04B 10/58 |
| | | | | 398/194 |
| 2016/0191195 | A1* | 6/2016 | Magri | H04J 14/02 |
| | | | | 398/79 |

OTHER PUBLICATIONS

Adaptive Distortion Compensation With Integrated Optical Finite Impulse Response Filters in High Bitrate Optical Communication Systems by Marc Bohn, et al.; IEEE Journal of Selected Topics in Quantum Electronics, vol. 10, No. 2—Mar./Apr. 2004.
Analytical Approximation of Nonlinear Distortions by Ernesto Ciaramella et al.; IEEE Photonics Technology Letters, vol. 17, No. 1—Jan. 2005.
Analytical Fiber-Optic Channel Model in the Presence of Cross-Phase Modulation by Marco Secondini et al.; IEEE Photonics Technology Letters, vol. 24, No. 22—Nov. 15, 2012.
Compensation of Dispersion and Nonlinear Impairments Using Digital Backpropagation by Ezra Ip et al.; Journal of Lightwave Technology, vol. 26, No. 20—Oct. 15, 2008.
On XPM Mitigation in WDM Fiber-Optic Systems by Marco Secondini et al.; IEEE Photonics Technology Letters, vol. 26, No. 22—Nov. 15, 2014.
Solving the Nonlinear Schrodinger Equation by Enrico Forestieri et al.; Optical Communication Theory and Techniques—2005.
The RP Method: A New Tool for the Iterative Solution of the Nonlinear Schrodinger Equation by Armando Vannucci et al.; Journal of Lightwave Technology, vol. 20, No. 7—Jul. 2002.
International Search Report for International application No. PCT/EP2014/059646—dated Feb. 13, 2015.

* cited by examiner

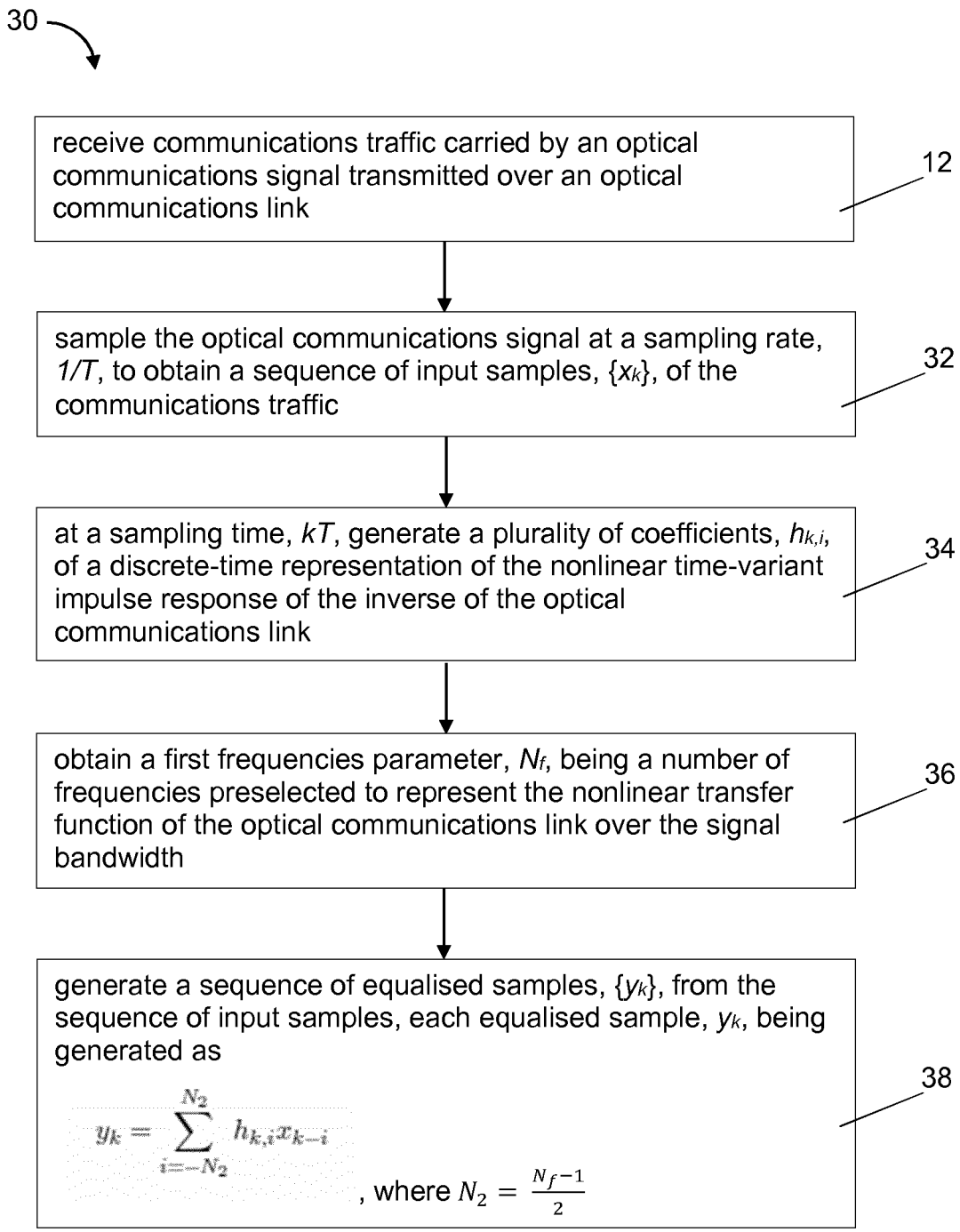

30

↓ receive communications traffic carried by an optical communications signal transmitted over an optical communications link — 12

↓ sample the optical communications signal at a sampling rate, $1/T$, to obtain a sequence of input samples, $\{x_k\}$, of the communications traffic — 32

↓ at a sampling time, $kT$, generate a plurality of coefficients, $h_{k,i}$, of a discrete-time representation of the nonlinear time-variant impulse response of the inverse of the optical communications link — 34

↓ obtain a first frequencies parameter, $N_f$, being a number of frequencies preselected to represent the nonlinear transfer function of the optical communications link over the signal bandwidth — 36

↓ generate a sequence of equalised samples, $\{y_k\}$, from the sequence of input samples, each equalised sample, $y_k$, being generated as $$y_k = \sum_{i=-N_2}^{N_2} h_{k,i} x_{k-i}$$

, where $N_2 = \frac{N_f - 1}{2}$ — 38

70 obtain a second frequencies parameter, *M*, being a number of frequencies preselected to represent a time- and frequency-dependent nonlinear distortion term of the nonlinear transfer function of the optical communications link over the signal bandwidth — 42 select one of the input samples, $x_k$, — 44 select a plurality, *M*, of the input samples centred around the selected one of the input samples — 46 calculate a discrete Fourier transform, $X_{k,m}$, of the selected plurality of input samples as $$X_{k,m} = \sum_{\ell=-M_2}^{M_2} x_{k+\ell} e^{-j2\pi\ell m/M}, \quad m = -M_2, \ldots, M_2$$

where $M_2 = \frac{M-1}{2}$ — 48 calculate a discrete Fourier transform, $\phi_{k,h}$, of said nonlinear distortion term as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*$$

$h = -N_2, \ldots, N_2$, using the respective $K\left(\frac{h}{N_f T}, \frac{m}{MT}, \frac{n}{MT}\right)$ of only the selected frequencies, M, for which the modulus of *h, m* and *n* are above a preselected threshold value. — 72 calculate the coefficients, $h_{k,i}$, as $$h_{k,i} = \sum_{h=-N_2}^{N_2} e^{-j\phi_{k,h}} e^{j2\pi hi/N_f}$$

— 52

NON-LINEAR PROPAGATION IMPAIRMENT EQUALIZATION

PRIORITY

This nonprovisional application is a U.S. National Stage Filing under 35 U.S.C. § 371 of International Patent Application Serial No. PCT/EP2014/059646, filed May 12, 2014, and entitled "Non-Linear Propagation Impairment Equalisation."

TECHNICAL FIELD

The invention relates to a method of non-linear propagation impairment equalisation and to a method of propagation impairment equalisation incorporating the method of non-linear propagation impairment equalisation. The invention additionally relates to an optical communications link non-linear propagation impairment equaliser and to optical communications signal receiver apparatus incorporating the optical communications link nonlinear propagation impairment equaliser.

BACKGROUND

The performance of long-haul fibre-optic systems is essentially limited by the interplay of chromatic dispersion, fibre nonlinearity and noise. The rediscovery of coherent detection has paved the way for implementing sophisticated signal processing techniques in the electrical domain. However, without the availability of a mathematical model describing the input-output relationship of a nonlinear fibre link, effective compensation of transmission impairments is very difficult to achieve. Unfortunately, no exact analytical solution of the nonlinear Schrödinger equation, NLSE, describing the propagation of an optical field complex envelope is known in the presence of both chromatic dispersion and fibre nonlinearity.

Several approximations of a solution of the NLSE have been considered, including inverse scattering, back-propagation and various perturbation methods, namely Logarithmic Perturbation, LP, Regular Perturbation, RP, combined Regular-Logarithmic Perturbation, RLP, and Volterra Series Transfer Function, VSTF. The inverse scattering method is able to provide an exact solution only if the attenuation is negligible, which is not a practical case. It is for this reason that one of the most widely studied compensation strategies is digital back-propagation, which is based on the split-step Fourier method, the most widely used method for numerically solving the NLSE. An equaliser for an optical transmission system based on digital back-propagation is disclosed in WO 2010/094339.

Although both LP and RP can arbitrarily approximate the exact solution of the NLSE by using appropriately high orders, in practice only first-order solutions are acceptable for implementing reasonably efficient signal processing strategies. Both first-order RP, which has been shown to coincide with the third-order VSTF, and LP methods involve the same triple integral, but the LP method is significantly more accurate and its first-order solution remains accurate at higher input power levels, where the first-order RP solution breaks down. Yet, the LP solution may undergo numerical problems when the intensity approaches zero. For a continuous-wave signal, this difficulty can be overcome by using the RLP, but its extension to modulated signals is not simple. The VSTF involves use of a triple integral and the resulting computational complexity is too high to make practical implementation feasible.

SUMMARY

It is an object to provide an improved method of non-linear propagation impairment equalisation. It is a further object to provide an improved method of propagation impairment equalisation. It is a further object to provide an improved optical communications link nonlinear propagation impairment equaliser. It is a further object to provide an improved optical communications signal receiver apparatus.

A first aspect of the invention provides a method of non-linear propagation impairment equalisation. The method comprising steps a., b., and c. Step a. comprises receiving communications traffic carried by an optical communications signal transmitted over an optical communications link. Step b. comprises generating a time dependent filter representation of a nonlinear time-variant impulse of the inverse of the optical communications link. Step c. comprises applying the time dependent filter representation to the received communications traffic to form non-linear propagation impairment equalised communications traffic.

This method of nonlinear propagation impairment equalisation may avoid the computational difficulty associated with the above mentioned prior art solutions. It may therefore require less computational effort to implement as compared with these prior art solutions, which may allow a practical implementation of this method.

In an embodiment, step b. comprises generating a discrete-time representation of the nonlinear time-variant impulse response of the inverse of the optical communications link using a frequency resolved log perturbation analytical approximation of the nonlinear Schrödinger equation. By using a frequency resolved log perturbation, FRLP, analytical approximation of the NLSE the impact of link nonlinearity may be described through a double integral, i.e. using a quadratic form, rather than a triple integral, as in VSTF. This may avoid the computational difficulty associated with the LP solution and the method may require less computational effort to implement as compared with the VSTF solution. Use of the FRLP may also result in the method being more intuitive than the prior art solutions since the nonlinear distortion is modelled as a multiplicative complex phase term. It will be appreciated that the optical communications link has a nonlinear transfer function and the nonlinear time-variant impulse response is obtained from the nonlinear transfer function.

In an embodiment, step a. additionally comprises sampling the optical communications signal at a sampling rate, $1/T$, to obtain a sequence of input samples, $\{x_k\}$, of the communications traffic. Step b. comprises, at a sampling time, $kT$, generating a plurality of coefficients, $h_{k,i}$, of the discrete-time representation of the nonlinear time-variant impulse response of the inverse of the optical communications link. The optical communications signal has a signal bandwidth and the optical communications link has a nonlinear transfer function. The nonlinear time-variant impulse response is a Fourier transform of said nonlinear transfer function. Step c. comprises obtaining a first frequencies parameter, $N_f$. $N_f$ is a number of frequencies selected to represent the nonlinear transfer function of the optical communications link over the signal bandwidth. Step c. comprises generating a sequence of equalised samples, $\{y_k\}$, from the sequence of input samples. Each equalised sample, $y_k$, is generated as $$y_k = \sum_{i=-N_2}^{N_2} h_{k,i} x_{k-i}, \text{ where } N_2 = \frac{N_f - 1}{2}.$$

By using a selected number of frequencies, $N_f$, to represent the signal bandwidth which is fewer than the full range of the frequencies in the signal bandwidth, the computational complexity of the method may be reduced. By appropriately selecting $N_f$ the method may offer an acceptable trade-off between computational complexity and performance. $N_f$ may be varied which may enable the method to optimise this trade-off.

In an embodiment, the coefficients, $h_{k,i}$, are generated as follows. A second frequencies parameter, M, is obtained. M is a number of frequencies selected to represent a time- and frequency-dependent nonlinear distortion term of the non-linear transfer function of the optical communications link over the signal bandwidth. One of the input samples, $x_k$, is selected and then a plurality, M, of the input samples are selected which are centred around the selected one of the input samples. A discrete Fourier transform, $X_{k,m}$, of the selected plurality of input samples is calculated as $$X_{k,m} = \sum_{\ell=-M_2}^{M_2} x_{k+\ell} e^{-j2\pi \ell m/M}, m = -M_2, \ldots, M_2 \text{ where } M_2 = \frac{M-1}{2}.$$

discrete Fourier transform $\varnothing_{k,h}$, of said time- and frequency-dependent nonlinear distortion term is calculated as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*, h = -N_2, \ldots, N_2$$

where $K\left(\frac{h}{N_f T}, \frac{m}{MT}, \frac{n}{MT}\right)$ is the Fourier transform of a Kernel function, $K(f,\mu,\upsilon)$. The Kernel function accounts for a nonlinear interaction efficiency between different frequency components and depends on physical parameters of the optical communications link. The coefficients, $h_{k,i}$, are then calculated as $$h_{k,i} = \sum_{h=-N_2}^{N_2} e^{-j\phi_{k,h}} e^{j2\pi hi/N_f},$$

which is the inverse discrete Fourier transform of a nonlinear transfer function of the optical communications link, $H_{NL}(t,f) = e^{-j\Theta(t,f)}$. By using a selected number of frequencies, M, being fewer than all of the frequencies in the signal bandwidth, the computational complexity of the calculation to obtain each equalised sample may be reduced. The complexity of the calculation required for each equalised sample scales as $N_f M^2$. The method may enable a convenient trade-off between performance and complexity to be achieved by properly selecting $N_f$ and M.

In an embodiment, the optical communications link has a plurality of link parameters: a length, L; a group velocity dispersion, $\beta_2$ z); a nonlinear coefficient, $\gamma(z)$; and a normalised power profile, $$a_u = \frac{P_u(z)}{P_u(0)}.$$

$P_u$ is the optical power of the optical communications signal. The inverse of the optical communications link has a plurality of link parameters: the same length, L; a group velocity dispersion parameter, $\beta'_2(z) = -\beta_2(L-z)$; a nonlinear coefficient, $\gamma'(z) = -\gamma(L-z)$; and a normalised power profile, $a'_u(z) = a_u(L-z)$.

$$K\left(\frac{h}{N_f T}, \frac{m}{MT}, \frac{n}{MT}\right)$$

is calculated using $K(f,\mu,\nu) = H_0(L,\mu-\nu+f) H_0^*(L,f) \times \int_0^L \gamma(z) \alpha_u(z) H_0(z,\mu)$
$H_0^*(z,\nu) H_0(z,f) H_0^*(z,\mu-\nu+f) dz$ in which $H_0(z,f) \triangleq \exp(-j2\pi^2 f^2 \int_0^z \beta_2(\xi) d\xi)$ is a linear transfer function of the optical communications link. The discrete-time representation of the nonlinear time-variant impulse response of the inverse of the optical communications link may be calculated using link parameters of the inverse of the optical communications link which are the inverse of the link parameters of the optical communications link.

In an embodiment, the coefficients, $h_{k,i}$, are generated using the respective $$K\left(\frac{h}{N_f T}, \frac{m}{MT}, \frac{n}{MT}\right)$$

of only a subset of the selected frequencies, M. This may enable the computational complexity of the calculation to obtain the coefficients $h_{k,i}$, and thus the calculation to obtain each equalised sample, to be reduced.

In an embodiment, the subset consists of each of the selected frequencies for which the modulus of h, m and n are above a preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the method comprises calculating the Kernel, $K(f,\mu,\upsilon)$, and performing spectral analysis of the Kernel to identify each of the selected frequencies for which the modulus of h, m and n are above the preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the subset consists of a predefined number of frequencies. This may enable the computational complexity of the calculation to obtain the coefficients $h_{k,i}$, and thus the calculation to obtain each equalised sample, to be reduced in a predefined manner.

In an embodiment, only some of the link parameters are known or the link parameters are not know precisely. The method additionally comprises optimising $$K\left(\frac{h}{N_f T}, \frac{m}{MT}, \frac{n}{MT}\right)$$

using an iterative adaptive estimation algorithm. This may enable the values of the Kernel coefficients to be initialised by calculation and then finely tuned using the iterative adaptive estimation algorithm.

In an embodiment, the method comprises estimating $$K\left(\frac{h}{N_f T}, \frac{m}{MT}, \frac{n}{MT}\right)$$

by providing a training optical communications signal, sampling the training optical communications signal to obtain a training sequence of input samples, transmitting the training optical communications signal across the optical communications link and sampling the training optical communications signal after transmission to obtain a training sequence of output samples. The method comprises estimating $$K\left(\frac{h}{N_f T}, \frac{m}{MT}, \frac{n}{MT}\right)$$

from the training sequence of input samples, the training sequence of output samples and the nonlinear time-varying transfer function of the optical communications link, $H_{NL}(t,f)=e^{-j\phi(t,f)}$, where $\phi(t,f)=\iint_{R^2} K(f,\mu,\nu)U(\mu)U^*(\nu)e^{j2\pi(\mu-\nu)t}d\mu d\nu$. The method comprises optimising the estimated $$K\left(\frac{h}{N_f T}, \frac{m}{MT}, \frac{n}{MT}\right)$$

using an iterative adaptive estimation algorithm. This may enable the values of the Kernel coefficients to be estimated by measurement and then finely tuned using the iterative adaptive estimation algorithm.

In an embodiment, the iterative adaptive estimation algorithm is one of the gradient algorithm for the minimization of the mean square error and the stochastic gradient algorithm for the minimization of the mean square error.

In an embodiment, the non-linear propagation impairment comprises self-phase modulation, SPM.

In an embodiment, the optical communications link is treated as comprising a plurality of sections. Steps b. and c. are applied to each section sequentially to equalise the non-linear propagation impairment associated with each section.

A second aspect of the invention provides a method of propagation impairment equalisation. The method comprises receiving communications traffic carried by an optical communications signal transmitted over an optical communications link. The method comprises performing linear propagation impairment equalisation on the received communications traffic to form linear propagation impairment equalised communications traffic. The method comprises performing non-linear propagation impairment equalisation on the linear propagation impairment equalised communications traffic, to form linear and non-linear propagation impairment equalised communications traffic. The non-linear propagation impairment equalisation comprises steps a., b., and c. Step a. comprises receiving communications traffic carried by an optical communications signal transmitted over an optical communications link. Step b. comprises generating a time dependent filter representation of a non-linear time-variant impulse of the inverse of the optical communications link. Step c. comprises applying the time dependent filter representation to the received communications traffic to form non-linear propagation impairment equalised communications traffic.

This method of propagation impairment equalisation may enable both linear and nonlinear propagation impairments to be equalised while avoiding the computational difficulty associated with the above mentioned prior art nonlinear propagation impairment equalisation solutions. It may therefore require less computational effort to implement as compared with these prior art solutions, which may allow a practical implementation of this method.

In an embodiment, step b. comprises generating a discrete-time representation of the nonlinear time-variant impulse of the inverse of the optical communications link using a frequency resolved log perturbation analytical approximation of the nonlinear Schrödinger equation. By using a frequency resolved log perturbation, FRLP, analytical approximation of the NLSE the impact of link nonlinearity may be described through a double integral, i.e. using a quadratic form, rather than a triple integral, as in VSTF. This may avoid the computational difficulty associated with the LP solution and the method may require less computational effort to implement as compared with the VSTF solution. Use of the FRLP may also result in the method being more intuitive than the prior art solutions since the nonlinear distortion is modelled as a multiplicative complex phase term. It will be appreciated that the optical communications link has a nonlinear transfer function and the nonlinear time-variant impulse response is obtained from the nonlinear transfer function.

In an embodiment, step a. additionally comprises sampling the optical communications signal at a sampling rate, 1/T, to obtain a sequence of input samples, $\{x_k\}$, of the communications traffic. Step b. comprises, at a sampling time, kT, generating a plurality of coefficients, $h_{k,i}$, of the discrete-time representation of the nonlinear time-variant impulse response of the inverse of the optical communications link. The optical communications signal has a signal bandwidth and the optical communications link has a nonlinear transfer function. The nonlinear time-variant impulse response is a Fourier transform of said nonlinear transfer function. Step c. comprises obtaining a first frequencies parameter, $N_f$. $N_f$ is a number of frequencies selected to represent the nonlinear transfer function of the optical communications link over the signal bandwidth. Step c. comprises generating a sequence of equalised samples, $\{y_k\}$, from the sequence of input samples. Each equalised sample, $y_k$, is generated as $$y_k = \sum_{i=-N_2}^{N_2} h_{k,i} x_{k-i}, \text{ where } N_2 = \frac{N_f - 1}{2}.$$

By using a selected number of frequencies, $N_f$, to represent the signal bandwidth which is fewer than the full range of the frequencies in the signal bandwidth, the computational complexity of the method may be reduced. By appropriately selecting $N_f$ the method may offer an acceptable trade-off between computational complexity and performance. $N_f$ may be varied which may enable the method to optimise this trade-off.

In an embodiment, the coefficients, $h_{k,i}$, are generated as follows. A second frequencies parameter, M, is obtained. M is a number of frequencies selected to represent a time- and frequency-dependent nonlinear distortion term of the nonlinear transfer function of the optical communications link over the signal bandwidth. One of the input samples, $x_k$, is selected and then a plurality, M, of the input samples are selected which are centred around the selected one of the input samples. A discrete Fourier transform, $X_{k,m}$, of the selected plurality of input samples is calculated as $$X_{k,m} = \sum_{\ell=-M_2}^{M_2} x_{k+\ell} e^{-j2\pi \ell m/M}, m = -M_2, \ldots, M_2 \text{ where } M_2 = \frac{M-1}{2}.$$

A discrete Fourier transform $\emptyset_{k,h}$, of said time- and frequency-dependent nonlinear distortion term is calculated as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*, h = -N_2, \ldots, N_2$$

where $K\left(\frac{h}{N_f T}, \frac{m}{MT}, \frac{n}{MT}\right)$ is the Fourier transform of a Kernel function, $K(f,\mu,\upsilon)$. The Kernel function accounts for a nonlinear interaction efficiency between different frequency components and depends on physical parameters of the optical communications link. The coefficients, $h_{k,i}$, are then calculated as $$h_{k,i} = \sum_{h=-N_2}^{N_2} e^{-j\phi_{k,h}} e^{j2\pi h i/N_f},$$

which is the inverse discrete Fourier transform of a nonlinear transfer function of the optical communications link, $H_{NL}(t,f) = e^{-j\Theta(t,f)}$. By using a selected number of frequencies, M, being fewer than all of the frequencies in the signal bandwidth, the computational complexity of the calculation to obtain each equalised sample may be reduced. The complexity of the calculation required for each equalised sample scales as $N_f M^2$. The method may enable a convenient trade-off between performance and complexity to be achieved by properly selecting $N_f$ and M.

In an embodiment, the optical communications link has a plurality of link parameters: a length, L; a group velocity dispersion, $\beta_2(z)$; a nonlinear coefficient, $\gamma(z)$; and a normalised power profile, $$a_u = \frac{P_u(z)}{P_u(0)}.$$

$P_u$ is optical power of the optical communications signal. The inverse of the optical communications link has a plurality of link parameters: the same length, L; a group velocity dispersion parameter, $\beta'_2(z) = -\beta_2(L-z)$; a nonlinear coefficient, $\gamma'(z) = -\gamma(L-z)$; and a normalised power profile, $a'_u(z) = a_u(L-z)$.

$$K\left(\frac{h}{N_f T}, \frac{m}{MT}, \frac{n}{MT}\right)$$

is calculated using $K(f,\mu,\upsilon) = H_0(L,\mu-\upsilon+f) H_0^*(L,f) \times \int_0^L \gamma(z) \alpha_u(z) H_0(z,\mu)$
$H_0^*(z,\upsilon) H_0(z,f) H_0^*(z,\mu-\upsilon+f) dz$ in which $H_0(z,f) \triangleq \exp(-j2\pi^2 f^2 \int_0^z \beta_2(\xi) d\xi)$ is a linear transfer function of the optical communications link. The discrete-time representation of the nonlinear time-variant impulse response of the optical communications link may be calculated using link parameters of the inverse of the optical communications link which are the inverse of the link parameters of the optical communications link.

In an embodiment, the coefficients, $h_{k,i}$, are generated using the respective $$K\left(\frac{h}{N_f T}, \frac{m}{MT}, \frac{n}{MT}\right)$$

of only a subset of the selected frequencies, M. This may enable the computational complexity of the calculation to obtain the coefficients $h_{k,i}$, and thus the calculation to obtain each equalised sample, to be reduced.

In an embodiment, the subset consists of each of the selected frequencies for which the modulus of h, m and n are above a preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the method comprises calculating the Kernel, $K(f,\mu,\upsilon)$, and performing spectral analysis of the Kernel to identify each of the selected frequencies for which the modulus of h, m and n are above the preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the subset consists of a predefined number of frequencies. This may enable the computational complexity of the calculation to obtain the coefficients $h_{k,i}$, and thus the calculation to obtain each equalised sample, to be reduced in a predefined manner.

In an embodiment, only some of the link parameters are known or the link parameters are not know precisely. The method additionally comprises optimising $$K\left(\frac{h}{N_f T}, \frac{m}{MT}, \frac{n}{MT}\right)$$

using an iterative adaptive estimation algorithm. This may enable the values of the Kernel coefficients to be initialised by calculation and then finely tuned using the iterative adaptive estimation algorithm.

In an embodiment, the method comprises estimating $$K\left(\frac{h}{N_f T}, \frac{m}{MT}, \frac{n}{MT}\right)$$

providing a training optical communications signal, sampling the training optical communications signal to obtain a training sequence of input samples, transmitting the training optical communications signal across the optical communications link and sampling the training optical communications signal after transmission to obtain a training sequence of output samples. The method comprises estimating $$K\left(\frac{h}{N_f T}, \frac{m}{MT}, \frac{n}{MT}\right)$$

from the training sequence of input samples, the training sequence of output samples and the nonlinear time-varying transfer function of the optical communications link, $H_{NL}(t,f) = e^{-j\phi(t,f)}$, where $\phi(t,f) = \int\!\!\int_{\mathbb{R}^2} K(f,\mu,\nu)U(\mu)U^*(\nu)e^{j2\pi(\mu-\nu)t}d\mu d\nu$. The method comprises optimising the estimated $$K\left(\frac{h}{N_f T}, \frac{m}{MT}, \frac{n}{MT}\right)$$

using an iterative adaptive estimation algorithm. This may enable the values of the Kernel coefficients to be estimated by measurement and then finely tuned using the iterative adaptive estimation algorithm.

In an embodiment, the iterative adaptive estimation algorithm is one of the gradient algorithm for the minimization of the mean square error and the stochastic gradient algorithm for the minimization of the mean square error.

In an embodiment, the non-linear propagation impairment comprises self-phase modulation, SPM.

In an embodiment the optical communications link is treated as comprising a plurality of sections. Steps b. and c. are applied to each section sequentially to equalise the non-linear propagation impairment associated with each section.

A third aspect of the invention provides an optical communications link nonlinear propagation impairment equaliser comprising an input, transfer function generation apparatus and equalisation apparatus. The input is arranged to receive communications traffic carried by an optical communications signal transmitted over an optical communications link. The transfer function generation apparatus is arranged to generate a time dependent filter representation of a nonlinear time-variant impulse response of the inverse of the optical communications link. The equalisation apparatus is arranged to apply the time dependent filter representation to the received communications traffic to form non-linear propagation impairment equalised communications traffic.

The equaliser may avoid the computational difficulty associated with the above mentioned prior art solutions. It may therefore require less computational effort to operate as compared with these prior art solutions, which may allow a practical implementation of the equaliser.

In an embodiment, the transfer function generation apparatus is arranged to generate a discrete-time representation of the nonlinear time-variant impulse response of the inverse of the optical communications link using a frequency resolved log perturbation analytical approximation of the nonlinear Schrödinger equation. By using a frequency resolved log perturbation, FRLP, analytical approximation of the NLSE the impact of link nonlinearity may be described through a double integral, i.e. using a quadratic form, rather than a triple integral, as in VSTF. This may avoid the computational difficulty associated with the LP solution and the transfer function generation apparatus may require less computational effort to operate as compared with using the VSTF solution. Configuring the transfer function generation apparatus to use the FRLP may also result in a more intuitive approach than the prior art solutions since the nonlinear distortion is modelled as a multiplicative complex phase term. It will be appreciated that the optical communications link has a nonlinear transfer function and the nonlinear time-variant impulse response is obtained from the nonlinear transfer function.

In an embodiment, the optical communications signal has a signal bandwidth and the optical communications link has a nonlinear transfer function. The nonlinear time-variant impulse response is a Fourier transform of said nonlinear transfer function. The input is arranged to receive a sequence of input samples, $\{x_k\}$, of the communications traffic. The input samples have a sampling rate, $1/T$. The transfer function generation apparatus is arranged to, at a sampling time, $kT$, generate a plurality of coefficients, $h_{k,i}$, of the discrete-time representation of the nonlinear time-variant impulse response of the inverse of the optical communications link. The equalisation apparatus is arranged to obtain a first frequencies parameter, $N_f$, being a number of frequencies selected to represent the nonlinear transfer function of the optical communications link over the signal bandwidth. The equalisation apparatus is arranged to generate a sequence of equalised samples, $\{y_k\}$, from the sequence of input samples. Each equalised sample, $y_k$, is generated as $$y_k = \sum_{i=-N_2}^{N_2} h_{k,i} x_{k-i}, \text{ where } N_2 = \frac{N_f - 1}{2}.$$

By using a selected number of frequencies, $N_f$, to represent the signal bandwidth which is fewer than the full range of frequencies in the signal bandwidth, the operational computational complexity may be reduced. By appropriately selecting $N_f$ the equaliser may offer an acceptable trade-off between computational complexity and performance. $N_f$ may be varied, which may enable this trade-off to be optimised.

In an embodiment, the transfer function generation apparatus is arranged to obtain a second frequencies parameter, $M$. The second frequencies parameter is a number of frequencies selected to represent a time- and frequency-dependent nonlinear distortion term of the nonlinear transfer function of the optical communications link over the signal bandwidth. The transfer function generation apparatus is arranged to select one of the input samples, $x_k$, and then select a plurality, $M$, of the input samples centred around the selected one of the input samples. The transfer function generation apparatus is arranged to calculate a discrete Fourier transform, $X_{k,m}$, of the selected plurality of input samples as $$X_{k,m} = \sum_{\ell=-M_2}^{M_2} x_{k+\ell} e^{-j2\pi\ell m/M},$$

$$m = -M_2, \ldots, M_2,$$

where $$M_2 = \frac{M-1}{2}$$

The transfer function generation apparatus is arranged to calculate a discrete Fourier transform, $\emptyset_{k,h}$, of said nonlinear distortion term as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*,$$

$$h = -N_2, \ldots, N_2,$$

where $$K\left(\frac{h}{N_f T}, \frac{m}{MT}, \frac{n}{MT}\right)$$

is the Fourier transform of a Kernel function, $K(f, \mu, \upsilon)$. The Kernel function accounts for a nonlinear interaction efficiency between different frequency components. The transfer function generation apparatus is arranged to calculate the coefficients, $h_{k,i}$, as $$h_{k,i} = \sum_{h=-N_2}^{N_2} e^{-j\phi_{k,h}} e^{j2\pi hi/N_f},$$

which is the inverse discrete Fourier transform of a nonlinear transfer function of the optical communications link, $H_{NL}(t,f) = e^{-j\Theta(t,f)}$. By using a selected number of frequencies, M, being fewer than all of the frequencies in the signal bandwidth, the computational complexity of the calculation to obtain each equalised sample may be reduced. The complexity of the calculation required for each equalised sample scales as $N_f M^2$. This may enable a convenient trade-off between performance and complexity of the equaliser to be achieved by properly selecting $N_f$ and M.

In an embodiment, the optical communications link has a plurality of link parameters: a length, L; a group velocity dispersion, $\beta_2(z)$; a nonlinear coefficient, $\gamma(z)$; and a normalised power profile, $$a_u = \frac{P_u(z)}{P_u(0)}.$$

$P_u$ is the optical power of the optical communications signal. The inverse of the optical communications link has a plurality of link parameters: the same length, L; a group velocity dispersion parameter, $\beta'_2(z) = -\beta_2(L-z)$; a nonlinear coefficient, $\gamma'(z) = -\gamma(L-z)$; and a normalised power profile, $a'_u(z) = a_u(L-z)$. The nonlinear equaliser further comprises adaptive Kernel estimation apparatus. The adaptive Kernel estimation apparatus is arranged to estimate $$K\left(\frac{h}{N_f T}, \frac{m}{MT}, \frac{n}{MT}\right)$$

using $$K(f,\mu,\upsilon) = H_0(L,\mu-\upsilon+f) H_0^*(L,f) \times \int_0^L \gamma(z) \alpha_u(z) H_0(z,\mu) H_0^*(z,\upsilon) H_0(z,f) H_0^*(z,\mu-\upsilon+f) dz$$

in which $H_0(z,f) \triangleq \exp(-j2\pi^2 f^2 \int_0^z \beta_2(\xi) d\xi)$ is a linear transfer function of the optical communications link. The adaptive Kernel estimation apparatus is arranged to provide the estimated $$K\left(\frac{h}{N_f T}, \frac{m}{MT}, \frac{n}{MT}\right)$$

to the transfer function generation apparatus. In an embodiment, only some of the link parameters are known or the link parameters are not know precisely. The adaptive Kernel estimation apparatus is arranged to optimise $$K\left(\frac{h}{N_f T}, \frac{m}{MT}, \frac{n}{MT}\right)$$

using an iterative adaptive estimation algorithm. The discrete-time representation of the nonlinear time-variant impulse response of the inverse of the optical communications link may be calculated using link parameters of the inverse of the optical communications link which are the inverse of the link parameters of the optical communications link.

In an embodiment, the optical communications link nonlinear propagation impairment equaliser further comprises complexity reduction apparatus arranged to select a subset of the selected frequencies, M. The transfer function generation apparatus is arranged to use the respective $$K\left(\frac{h}{N_f T}, \frac{m}{MT}, \frac{n}{MT}\right)$$

of only said subset of the selected frequencies. This may enable the computational complexity of the calculation to obtain the coefficients $h_{k,i}$, and thus the calculation to obtain each equalised sample, to be reduced.

In an embodiment, the subset consists of each of the selected frequencies for which the modulus of h, m and n are above a preselected threshold value. This may enable the computational complexity of the calculation to obtain the coefficients $h_{k,i}$, and thus the calculation to obtain each equalised sample, to be reduced while minimizing reduction in the performance of the equaliser.

In an embodiment, the adaptive Kernel estimation apparatus is arranged to calculate the Kernel, $K(f,\mu,\upsilon)$, and to perform spectral analysis of the Kernel to identify each of the selected frequencies for which the modulus of h, m and n are above the preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the subset consists of a predefined number of frequencies. This may enable the computational complexity of the calculation to obtain the coefficients $h_{k,i}$, and thus the calculation to obtain each equalised sample, to be reduced in a predefined manner.

In an embodiment, only some of the link parameters are known or the link parameters are not know precisely. The adaptive Kernel estimation apparatus is additionally arranged to optimise $$K\left(\frac{h}{N_f T}, \frac{m}{MT}, \frac{n}{MT}\right)$$

using an iterative adaptive estimation algorithm. This may enable the values of the Kernel coefficients to be initialised by calculation and then finely tuned using the iterative adaptive estimation algorithm.

In an embodiment, the adaptive Kernel estimation apparatus is arranged to receive a training sequence of input samples and a training sequence of output samples. The adaptive Kernel estimation apparatus is arranged to estimate $$K\left(\frac{h}{N_f T}, \frac{m}{MT}, \frac{n}{MT}\right)$$

from the training sequence of input samples, the training sequence of output samples and the nonlinear time-varying transfer function of the optical communications link, $H_{NL}(t,f)=e^{-j\phi(t,f)}$, where $\phi(t,f)=\int\!\!\int_{\mathbb{R}^2} K(f,\mu,\nu)U(\mu)U^*(\nu)e^{j2\pi(\mu-\nu)t}d\mu d\nu$ The adaptive Kernel estimation apparatus is arranged to optimise the estimated $$K\left(\frac{h}{N_f T}, \frac{m}{MT}, \frac{n}{MT}\right)$$

using an iterative adaptive estimation algorithm. This may enable the values of the Kernel coefficients to be estimated by measurement and then finely tuned using the iterative adaptive estimation algorithm.

In an embodiment, the iterative adaptive estimation algorithm is one of the gradient algorithm for the minimization of the mean square error and the stochastic gradient algorithm for the minimization of the mean square error.

In an embodiment, the non-linear propagation impairment comprises self-phase modulation, SPM.

In an embodiment, the optical communications link nonlinear propagation impairment equaliser comprises a plurality of sets of transfer function generation apparatus and equalisation apparatus. The transfer function apparatus and the equalisation apparatus sets are arranged sequentially. In each set, the transfer function generation apparatus is arranged to generate a time dependent filter representation of a nonlinear time-variant impulse response of the inverse of a respective section of the optical communications link and the equalisation apparatus is arranged to apply the time dependent filter representation to the communications traffic received by the said set to form partially non-linear propagation impairment equalised communications traffic. The computational complexity of each transfer function apparatus and each equalisation apparatus may therefore be reduced, which may enable faster operation. The equaliser may therefore be used to equalise higher levels of nonlinear propagation impairment.

A fourth aspect of the invention provides optical communications signal receiver apparatus comprising an optical receiver and an optical communications link nonlinear propagation impairment equaliser. The optical receiver is arranged to receive an optical communications signal from an optical communications link, the optical communications signal carrying communications traffic. The optical communications link nonlinear propagation impairment equaliser is arranged to receive communications traffic from the optical receiver. The optical communications link nonlinear propagation impairment equaliser comprises an input, transfer function generation apparatus and equalisation apparatus.

The input is arranged to receive communications traffic carried by an optical communications signal transmitted over an optical communications link. The transfer function generation apparatus is arranged to generate a time dependent filter representation of a nonlinear time-variant impulse response of the inverse of the optical communications link. The equalisation apparatus is arranged to apply the time dependent filter representation to the received communications traffic to form non-linear propagation impairment equalised communications traffic.

The equaliser may avoid the computational difficulty associated with the above mentioned prior art solutions. It may therefore require less computational effort to operate the receiver as compared with receivers using the above prior art nonlinear propagating impairment equalisation solutions, which may allow a practical implementation of the receiver.

In an embodiment, the transfer function generation apparatus is arranged to generate a discrete-time representation of the nonlinear time-variant impulse response of the inverse of the optical communications link using a frequency resolved log perturbation analytical approximation of the nonlinear Schrödinger equation. By using a frequency resolved log perturbation, FRLP, analytical approximation of the NLSE the impact of link nonlinearity may be described through a double integral, i.e. using a quadratic form, rather than a triple integral, as in VSTF. This may avoid the computational difficulty associated with the LP solution and the transfer function generation apparatus may require less computational effort to operate as compared with using the VSTF solution. Configuring the transfer function generation apparatus to use the FRLP may also result in a more intuitive approach than the prior art solutions since the nonlinear distortion is modelled as a multiplicative complex phase term. It will be appreciated that the optical communications link has a nonlinear transfer function and the nonlinear time-variant impulse response is obtained from the nonlinear transfer function.

In an embodiment, the optical communications signal has a signal bandwidth and the optical communications link has a nonlinear transfer function. The nonlinear time-variant impulse response is a Fourier transform of said nonlinear transfer function. The input is arranged to receive a sequence of input samples, $\{x_k\}$, of the communications traffic. The input samples have a sampling rate, $1/T$. The transfer function generation apparatus is arranged to, at a sampling time, $kT$, generate a plurality of coefficients, $h_{k,i}$, of the discrete-time representation of the nonlinear time-variant impulse response of the inverse of the optical communications link. The equalisation apparatus is arranged to obtain a first frequencies parameter, $N_f$, being a number of frequencies selected to represent the nonlinear transfer function of the optical communications link over the signal bandwidth. The equalisation apparatus is arranged to generate a sequence of equalised samples, $\{y_k\}$, from the sequence of input samples. Each equalised sample, $y_k$, is generated as $$y_k = \sum_{i=-N_2}^{N_2} h_{k,i} x_{k-i},$$

where $$N_2 = \frac{N_f - 1}{2}.$$

By using a selected number of frequencies, $N_f$, to represent the signal bandwidth which is fewer than the full range of frequencies in the signal bandwidth, the operational computational complexity may be reduced. By appropriately selecting $N_f$ the equaliser may offer an acceptable trade-off between computational complexity and performance. $N_f$ may be varied, which may enable this trade-off to be optimised.

In an embodiment, the transfer function generation apparatus is arranged to obtain a second frequencies parameter, M. The second frequencies parameter is a number of frequencies selected to represent a time- and frequency-dependent nonlinear distortion term of the nonlinear transfer function of the optical communications link over the signal bandwidth. The transfer function generation apparatus is arranged to select one of the input samples, $x_k$, and then select a plurality, M, of the input samples centred around the selected one of the input samples. The transfer function generation apparatus is arranged to calculate a discrete Fourier transform, $X_{k,m}$, of the selected plurality of input samples as $$X_{k,m} = \sum_{\ell=-M_2}^{M_2} x_{k+\ell} e^{-j2\pi\ell m/M},$$

$$m = -M_2, \ldots, M_2,$$

where $$M_2 = \frac{M-1}{2}.$$

The transfer function generation apparatus is arranged to calculate a discrete Fourier transform, $\varnothing_{k,h}$, of said nonlinear distortion term as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*,$$

$$h = -N_2, \ldots, N_2,$$

where $$K\left(\frac{h}{N_f T}, \frac{m}{MT}, \frac{n}{MT}\right)$$

is the Fourier transform of a Kernel function, $K(f, \mu, \upsilon)$. The Kernel function accounts for a nonlinear interaction efficiency between different frequency components. The transfer function generation apparatus is arranged to calculate the coefficients, $h_{k,i}$, as $$h_{k,i} = \sum_{h=-N_2}^{N_2} e^{-j\phi_{k,h}} e^{j2\pi h i/N_f},$$

which is the inverse discrete Fourier transform of a nonlinear transfer function of the optical communications link, $H_{NL}(t,f)=e^{-j\Theta(t,f)}$. By using a selected number of frequencies, M, being fewer than all of the frequencies in the signal bandwidth, the computational complexity of the calculation to obtain each equalised sample may be reduced. The complexity of the calculation required for each equalised sample scales as $N_f M^2$. This may enable a convenient trade-off between performance and complexity of the equaliser to be achieved by properly selecting $N_f$ and M.

In an embodiment, the optical communications link has a plurality of link parameters: a length, L; a group velocity dispersion, $\beta_2(z)$; a nonlinear coefficient, $\gamma(z)$; and a normalised power profile, $$a_u = \frac{P_u(z)}{P_u(0)}.$$

$P_u$ is the optical power of the optical communications signal. The inverse of the optical communications link has a plurality of link parameters: the same length, L; a group velocity dispersion parameter, $\beta'_2(z)=-\beta_2(L-z)$; a nonlinear coefficient, $\gamma'(z)=-\gamma(L-z)$; and a normalised power profile, $\alpha'_u(z)=\alpha_u(L-z)$. The nonlinear equaliser further comprises adaptive Kernel estimation apparatus. The adaptive Kernel estimation apparatus is arranged to estimate $$K\left(\frac{h}{N_f T}, \frac{m}{MT}, \frac{n}{MT}\right)$$

using $$K(f,\mu,\nu)=H_0(L,\mu-\nu+f)H_0^*(L,f) \times \int_0^L \gamma(z)\alpha_u(z)H_0(z,\mu)$$
$$H_0^*(z,\nu)H_0(z,f)H_0^*(z,\mu-\nu+f)dz$$

in which $H_0(z,f) \triangleq \exp(-j2\pi^2 f^2 \int_0^z \beta_2(\xi)d\xi)$ is a linear transfer function of the optical communications link. The adaptive Kernel estimation apparatus is arranged to provide the estimated $$K\left(\frac{h}{N_f T}, \frac{m}{MT}, \frac{n}{MT}\right)$$

to the transfer function generation apparatus.

In an embodiment, only some of the link parameters are known or the link parameters are not know precisely. The adaptive Kernel estimation apparatus is arranged to optimise $$K\left(\frac{h}{N_f T}, \frac{m}{MT}, \frac{n}{MT}\right)$$

using an iterative adaptive estimation algorithm. The discrete-time representation of the nonlinear time-variant impulse response of the inverse of the optical communications link may be calculated using link parameters of the inverse of the optical communications link which are the inverse of the link parameters of the optical communications link.

In an embodiment, the optical communications link nonlinear propagation impairment equaliser further comprises complexity reduction apparatus arranged to select a subset of the selected frequencies, M. The transfer function generation apparatus is arranged to use the respective $$K\left(\frac{h}{N_f T}, \frac{m}{MT}, \frac{n}{MT}\right)$$

of only said subset of the selected frequencies. This may enable the computational complexity of the calculation to obtain the coefficients $h_{k,i}$, and thus the calculation to obtain each equalised sample, to be reduced.

In an embodiment, the subset consists of each of the selected frequencies for which the modulus of h, m and n are above a preselected threshold value. This may enable the computational complexity of the calculation to obtain the coefficients $h_{k,i}$, and thus the calculation to obtain each equalised sample, to be reduced while minimizing reduction in the performance of the equaliser.

In an embodiment, the adaptive Kernel estimation apparatus is arranged to calculate the Kernel, $K(f,\mu,\upsilon)$, and to perform spectral analysis of the Kernel to identify each of the selected frequencies for which the modulus of h, m and n are above the preselected threshold value. This may enable the computational complexity of the calculation to obtain the coefficients $h_{k,i}$, and thus the calculation to obtain each equalised sample, to be reduced while minimizing reduction in the performance of the method.

In an embodiment, the subset consists of a predefined number of frequencies. This may enable the computational complexity of the calculation to obtain the coefficients $h_{k,i}$, and thus the calculation to obtain each equalised sample, to be reduced in a predefined manner.

In an embodiment, only some of the link parameters are known or the link parameters are not know precisely. The adaptive Kernel estimation apparatus is additionally arranged to optimise $$K\left(\frac{h}{N_fT}, \frac{m}{MT}, \frac{n}{MT}\right)$$

using an iterative adaptive estimation algorithm. This may enable the values of the Kernel coefficients to be initialised by calculation and then finely tuned using the iterative adaptive estimation algorithm.

In an embodiment, the adaptive Kernel estimation apparatus is arranged to receive a training sequence of input samples and a training sequence of output samples. The adaptive Kernel estimation apparatus is arranged to estimate $$K\left(\frac{h}{N_fT}, \frac{m}{MT}, \frac{n}{MT}\right)$$

from the training sequence of input samples, the training sequence of output samples and the nonlinear time-varying transfer function of the optical communications link, $H_{NL}(t,f)=e^{-j\phi(t,f)}$, where $\phi(t,f)=\int\int_{R^2} K(f,\mu,v)U(\mu)U^*(v)e^{j2\pi(\mu-v)t}d\mu dv$ The adaptive Kernel estimation apparatus is arranged to optimise the estimated $$K\left(\frac{h}{N_fT}, \frac{m}{MT}, \frac{n}{MT}\right)$$

using an iterative adaptive estimation algorithm. This may enable the values of the Kernel coefficients to be estimated by measurement and then finely tuned using the iterative adaptive estimation algorithm.

In an embodiment, the iterative adaptive estimation algorithm is one of the gradient algorithm for the minimization of the mean square error and the stochastic gradient algorithm for the minimization of the mean square error.

In an embodiment, the non-linear propagation impairment comprises self-phase modulation, SPM.

In an embodiment, the optical communications signal receiver apparatus further comprises an optical communications link linear propagation impairment equaliser which is arranged to receive communications traffic from the optical receiver. The optical communications link linear propagation impairment equaliser is arranged to form linear propagation impairment equalised communications traffic. The optical communications link nonlinear propagation impairment equaliser is arranged to receive the linear propagation impairment equalised communications traffic from the optical communications link linear propagation impairment equaliser. The receiver apparatus may therefore equalise both linear and nonlinear propagating impairments.

In an embodiment, the optical communications signal receiver apparatus comprises a plurality of said optical communications link nonlinear propagation impairment equalisers. A first said nonlinear propagation impairment equaliser is arranged to receive communications traffic from the optical receiver and each subsequent nonlinear propagation impairment equaliser arranged to receive nonlinear propagation impairment equalised traffic from a respective preceding nonlinear propagation impairment equaliser. Each said nonlinear propagation impairment equaliser is arranged to generate a time dependent filter representation of a nonlinear time-variant impulse response of the inverse of a respective section of the optical communications link. Each said nonlinear propagation impairment equaliser is arranged to apply the time dependent filter representation to the respective received communications traffic. This arrangement may reduce the computational complexity and effort required to operate each nonlinear propagation impairment equaliser and may offer a practical way to perform nonlinear propagation impairment equalisation on optical communications links having greater level of nonlinear propagation impairment.

A fifth aspect of the invention provides a data carrier having computer readable instructions embodied therein. The said computer readable instructions are for providing access to resources available on a processor and the computer readable instructions comprising instructions to cause the processor to perform any of the above steps of the method of non-linear propagation impairment equalisation.

In an embodiment, the data carrier is a non-transitory data carrier.

Embodiments of the invention will now be described, by way of example only, with reference to the accompanying drawings.

BRIEF DESCRIPTION OF THE DRAWINGS

FIG. 3 shows the steps of a method according to a third embodiment of the invention of non-linear propagation impairment equalisation;

FIG. 6 shows the steps of generating coefficients, $h_{k,i}$, in a method according to a sixth embodiment of the invention of non-linear propagation impairment equalisation;

DETAILED DESCRIPTION

Figure 1:
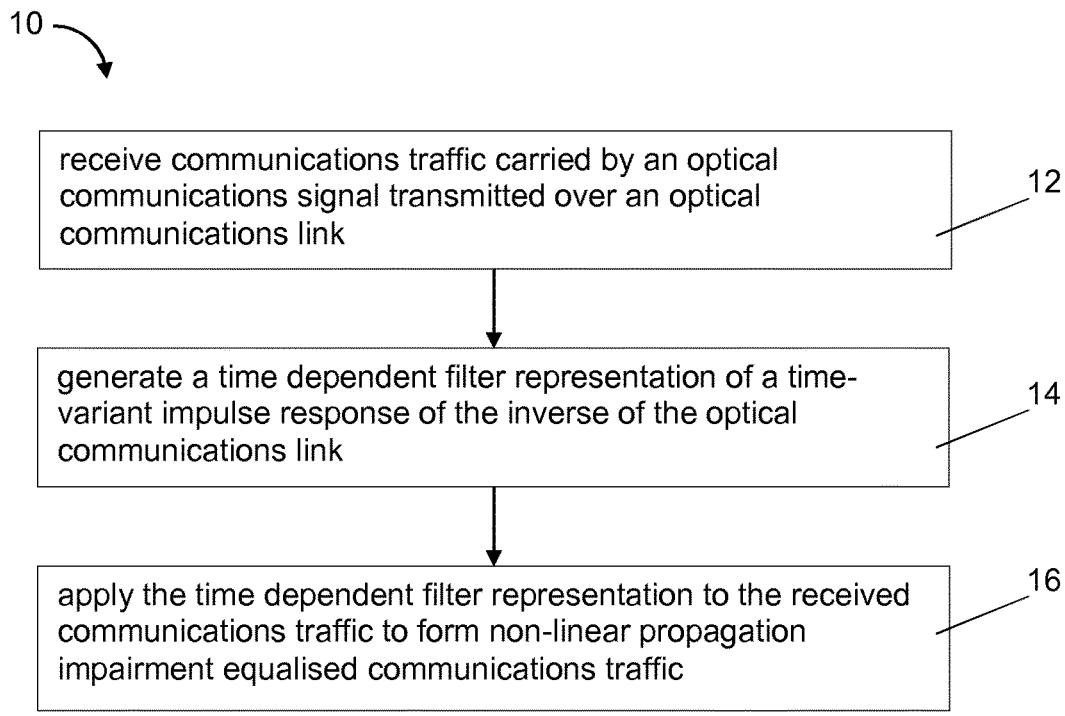
FIG. 1 shows the steps of a method according to a first embodiment of the invention of non-linear propagation impairment equalisation.

Referring to FIG. 1, a first embodiment of the invention provides a method 10 of non-linear propagation impairment equalisation. The method comprises steps a., b., and c, as follows. Step a. comprises receiving communications traffic carried by an optical communications signal transmitted over an optical communications link 12. Step b. comprises generating a time dependent filter representation of a nonlinear time-variant impulse response of the inverse of the optical communications link 14. Step c. comprises applying the time dependent filter representation to the received communications traffic to form non-linear propagation impairment equalised communications traffic 16.

Figure 2:
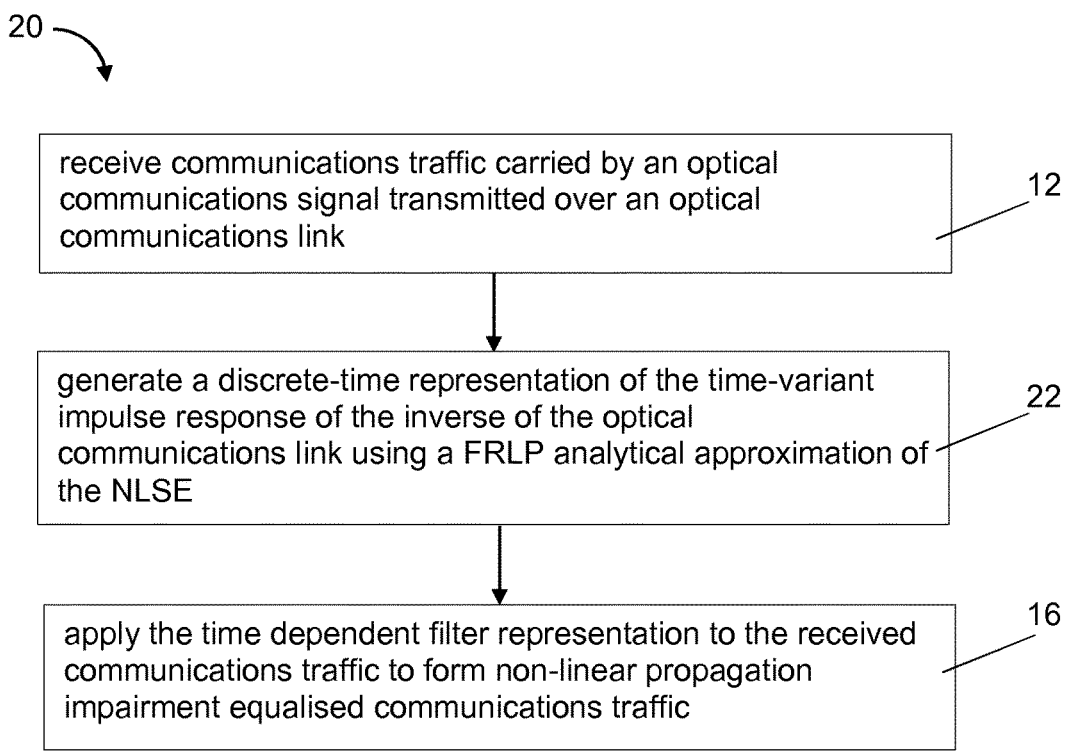
FIG. 2 shows the steps of a method according to a second embodiment of the invention of non-linear propagation impairment equalisation.

A second embodiment of the invention provides a method 20 of non-linear propagation impairment equalisation having the steps shown in FIG. 2. The method 20 of this embodiment is similar to the method 10 of the first embodiment, with the following modifications.

In this embodiment, the time dependent filter representation of the nonlinear time-variant impulse response of the inverse of the optical communications link is a discrete-time representation of the nonlinear time-variant impulse response. The discrete-time representation is generated 22 using a Frequency Resolved Log Perturbation, FRLP, analytical approximation of the nonlinear Schrödinger equation, NLSE.

In the FRLP analytical approximation of the NLSE the input optical signal at $z=0$ can be expressed as $$u(0,t) = \int_{-\infty}^{\infty} U(f) e^{j2\pi ft} df \quad (1)$$

Where U(f) is its Fourier transform. The optical signal propagates through a nonlinear medium, for example an optical fibre link (comprising, for example, several sections of optical fibre with, possibly, in-line optical amplifiers) having a length L, group velocity dispersion, GVD, parameter $\beta_2(z)$, which can change from section to section, a nonlinear coefficient $\gamma(z)$, which can change from section to section, and a normalised power profile, $$a_u = \frac{P_u(z)}{P_u(0)}.$$

where $P_u$ is the optical power of the optical communications signal at $L=0$ and z, which depends on attenuation and amplification within the optical fibre link. According to the FRLP, the output optical signal at $z=L$ can be approximated as $$u(L,t) \approx \int_{-\infty}^{\infty} U(f) H_0(L,f) H_{NL}(t,f) e^{j2\pi ft} df \quad (2)$$

where:

$$H_0(z,f) \triangleq \exp(-j2\pi^2 f^2 \int_0^z \beta_2(\xi) d\xi) \quad (3)$$

is the linear transfer function of the optical fibre, accounting only for GVD, from 0 to z;

$$H_{NL}(t,f) = e^{-j\phi(t,f)} \quad (4)$$

is the nonlinear time-varying transfer function of the optical fibre link, accounting for nonlinear propagation impairment;

$$\phi(t,f) = \int\int_{\mathbb{R}^2} K(f,\mu,\nu) U(\mu) U^*(\nu) e^{j2\pi(\mu-\nu)t} d\mu d\nu \quad (5)$$

is the time- and frequency-variant term of equation 4 which represents nonlinear propagation impairment; and $$K(f,\mu,\nu) = H_0(L,\mu-\nu+f) H_0^*(L,f) \times \int_0^L \gamma(z) \alpha_u(z) H_0(z,\mu)$$
$$H_0^*(z,\nu) H_0(z,f) H_0^*(z,\mu-\nu+f) dz \quad (6)$$

is the Kernel function that accounts for nonlinear interaction efficiency between different frequency components and depends on characteristics of the optical fibre link.

Further details of the FRLP analytical approximation of the NLSE are reported by M. Secondini and E. Forestieri, "Analytical fiber-optic channel model in the presence of cross-phase modulation," IEEE Photonics Technology Letters, volume 24, 2012, pages 2016-2019.

As will be well known to the person skilled in the art the NLSE is used to describe propagation of an optical signal through a nonlinear medium, such as an optical waveguide, which may be an optical fibre or a planar waveguide. It will therefore be understood that the optical communications link to which the method 20 of this embodiment applies comprises a nonlinear medium. It will be appreciated that any non-linear propagation impairment experienced by the optical communications signal during transmission over the optical communications link may be equalised using the method 20. In the case of optical fibre, this will typically comprise self-phase modulation, SPM.

A third embodiment of the invention provides a method 30 of non-linear propagation impairment equalisation which is similar to the method 20 of the second embodiment, with the following modifications. The steps of the method 30 of this embodiment are shown in FIG. 3.

In this embodiment, the optical communications link is an optical fibre communications link which has a nonlinear transfer function. The nonlinear time-variant impulse response is a Fourier transform of the nonlinear transfer function of the optical fibre communications link. The optical communications signal has a signal bandwidth.

Step a. additionally comprises sampling 32 the optical communications signal at a sampling rate, $1/T$, to obtain a sequence of input samples, $\{x_k\}$, of the communications traffic. Step b. comprises, at a sampling time, $kT$, generating 34 a plurality of coefficients, $h_{k,i}$, of the discrete-time representation of the nonlinear time-variant impulse response of the inverse of the optical communications link. The input samples are taken at sampling rate, $1/T$, which means that the samples are separated from each other by a time interval $T$. Thus the k-th sample, $x_k$, is taken at time $kT$. k is therefore an index of the respective sample. $h_{k,i}$, is the i-th coefficient of the discrete-time representation of the nonlinear time-variant impulse response the inverse of the optical communications link evaluated at time $kT$.

Step c. comprises obtaining 36 a first frequencies parameter, $N_f$, and generating 38 a sequence of equalised samples, $\{y_k\}$, from the sequence of input samples. The first frequencies parameter, $N_f$, is a number of frequencies selected to represent the nonlinear transfer function of the optical fibre communications link over the signal bandwidth.

Each equalised sample, $y_k$, is generated as $$y_k = \sum_{i=-N_2}^{N_2} h_{k,i} x_{k-i}, \text{ where } N_2 = \frac{N_f - 1}{2}.$$

Figure 4:
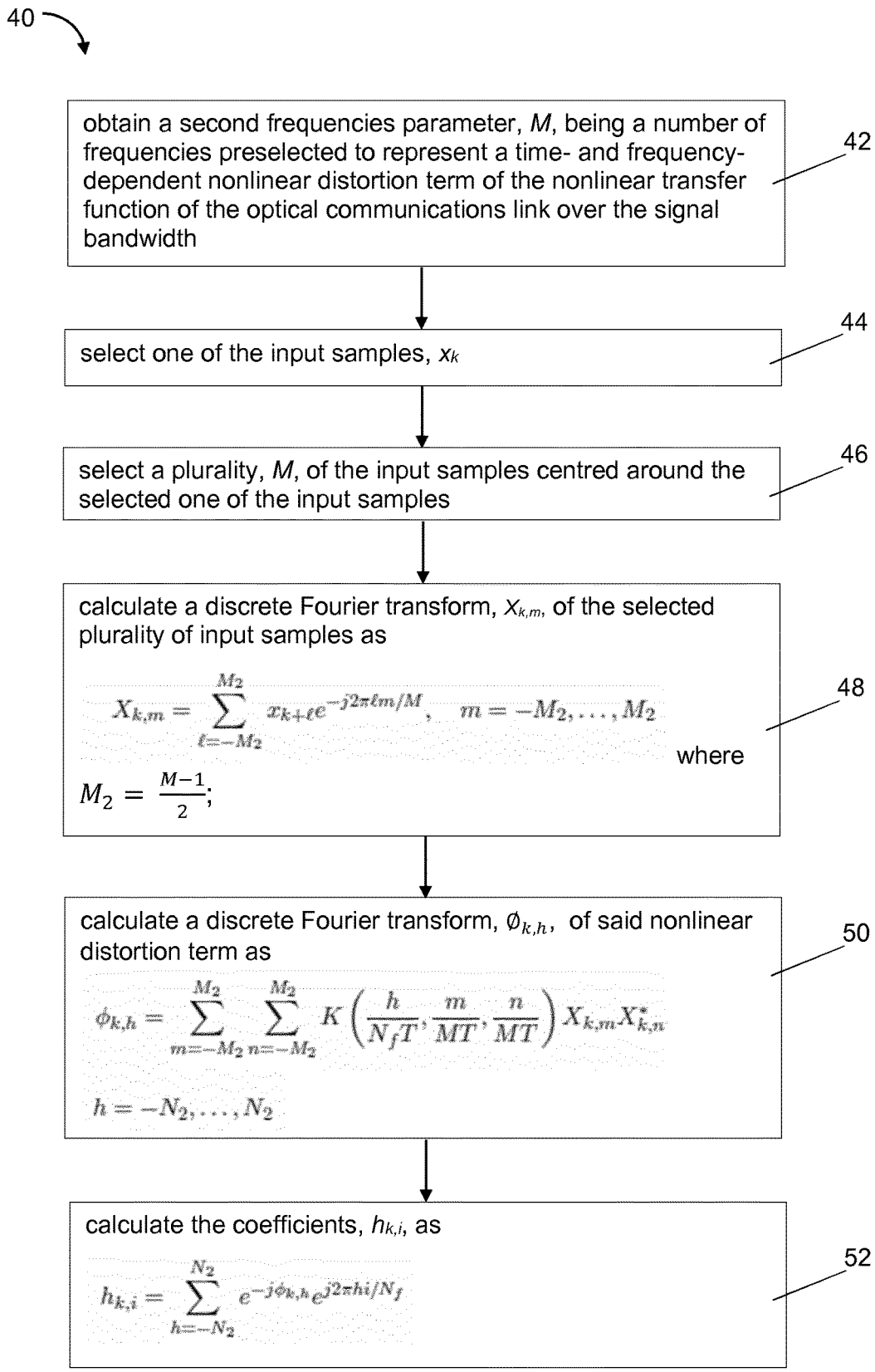
FIG. 4 shows the steps of generating coefficients, $h_{k,i}$, in a method according to a fourth embodiment of the invention of non-linear propagation impairment equalisation.

A fourth embodiment of the invention provides a method of non-linear propagation impairment equalisation which is similar to the method 30 of the previous embodiment, with the following modifications. Details of step b., that is the process of generating a plurality of coefficients, $h_{k,i}$, at each sampling time, $kT$, of this embodiment are shown in FIG. 4.

The coefficients, $h_{k,i}$, depend on the input samples, $\{x_k\}$, and change with time. At each sampling time, $kT$, a new set of coefficients are generated 40 as follows.

A second frequencies parameter, M, is obtained 42. M is a number of frequencies selected to represent a time- and frequency-dependent nonlinear distortion term of the nonlinear transfer function of the optical communications link over the signal bandwidth. One of the input samples, $x_k$, is selected 44 and then a plurality, M, of the input samples centred around the selected input sample are selected 46. A sequence of input samples, $\{x_k\}$, is thereby selected at sampling time $kT$.

A discrete Fourier transform, $X_{k,m}$, of the selected input samples is calculated as $$X_{k,m} = \sum_{\ell=-M_2}^{M_2} x_{k+\ell} e^{-j2\pi \ell m/M}, m = -M_2, \ldots, M_2, \text{ where } M_2 = \frac{M-1}{2}.$$

A discrete Fourier transform $\emptyset_{k,h}$, of the nonlinear distortion term is calculated 50 as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*, h = -N_2, \ldots, N_2$$

where $K\left(\frac{h}{N_f T}, \frac{m}{MT}, \frac{n}{MT}\right)$ is the Fourier transform of a Kernel function, $K(f,\mu,\upsilon)$, that accounts for a nonlinear interaction efficiency between different frequency components and depends on characteristics of the optical fibre communications link.

The Kernel function is:

$$K(f,\mu,\nu)=H_0(L,\mu-\nu+f)H_0^*(L,f)\times\int_0^L \gamma(z)\alpha_u(z)H_0(z,\mu)$$
$$H_0^*(z,\nu)H_0(z,f)H_0^*(z,\mu-\nu+f)dz$$

in which $H_0(z,f) \triangleq \exp(-j2\pi^2 f^2 \int_0^z \beta_2(\xi)d\xi)$ is a linear transfer function of the optical communications link, which has a plurality of link parameters: a length, L; a group velocity dispersion, $\beta_2(z)$; a nonlinear coefficient, $\gamma(z)$; and a normalised power profile, $$a_u = \frac{P_u(z)}{P_u(0)}.$$

$P_u$ is the optical power of the optical communications signal. The inverse of the optical communications link has a plurality of link parameters: the same length, L; a group velocity dispersion parameter, $\beta'_2(z)=-\beta_2(L-z)$; a nonlinear coefficient, $\gamma'(z)=-\gamma(L-z)$; and a normalised power profile, $\alpha'_u(z)=\alpha_u(L-z)$.

The coefficients, $h_{k,i}$, are then calculated 52 as $$h_{k,i} = \sum_{h=-N_2}^{N_2} e^{-j\phi_{k,h}} e^{j2\pi h i/N_f}.$$

Each of the Fourier transforms may be calculated using a fast Fourier transform, FFT, algorithm, which will be well known to the skilled person. If the first frequencies parameter, $N_f$, is selected to be 1, i.e. a single frequency within the signal bandwidth is used to represent the nonlinear transfer function of the optical communications link over the whole signal bandwidth, then $$y_k = \sum_{i=-N_2}^{N_2} h_{k,i} x_{k-i}$$

reduces to a simple multiplication of the input sample, $x_k$, taken at sampling time $kT$ multiplied by the coefficient $h_{k,0}$, which is readily evaluated as $h_{k,0}=e^{-j\emptyset_{k,0}}$.

The complexity of the method per each equalised sample scales as $N_f M^2$. A convenient trade-off between the performance of the method and its complexity can be achieved by properly selecting $N_f$ and M.

Figure 5:
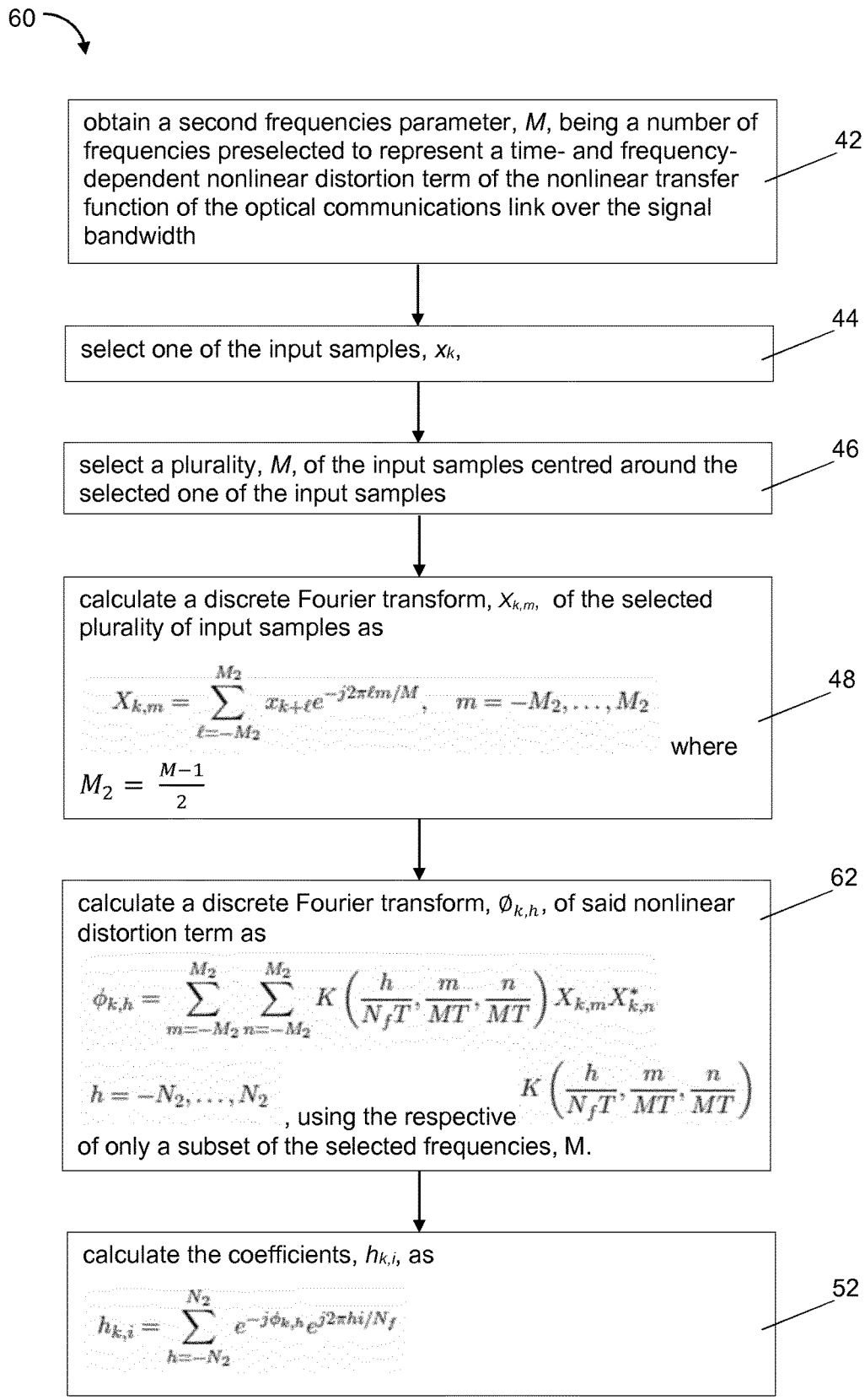
FIG. 5 shows the steps of generating coefficients, $h_{k,i}$, in a method according to a fifth embodiment of the invention of non-linear propagation impairment equalisation.

A fifth embodiment of the invention provides a method of non-linear propagation impairment equalisation which is similar to the method of the previous embodiment, with the following modifications. Details of the process 60 of generating a plurality of coefficients, $h_{k,0}$, at each sampling time, kT, of this embodiment are shown in FIG. 5.

In this embodiment, the respective values of $$K\left(\frac{h}{N_f T}, \frac{m}{MT}, \frac{n}{MT}\right)$$

of only a subset of the selected frequencies, M, are used in the discrete Fourier transform $\emptyset_{k,h}$, of the nonlinear distortion term 62.

A sixth embodiment of the invention provides a method of non-linear propagation impairment equalisation which is similar to the method of the previous embodiment, with the following modifications. Details of the process 70 of generating a plurality of coefficients, $h_{k,i}$, at each sampling time, kT, of this embodiment are shown in FIG. 6.

In this embodiment, the respective values $$K\left(\frac{h}{N_f T}, \frac{m}{MT}, \frac{n}{MT}\right)$$

of only those of the selected frequencies, M, for which the modulus of h, m and n are above a preselected threshold value are used 72. The Kernel function is therefore effectively forced to zero for values of the indexes h, m, n whose modulus is below the preselected threshold.

Figure 7:
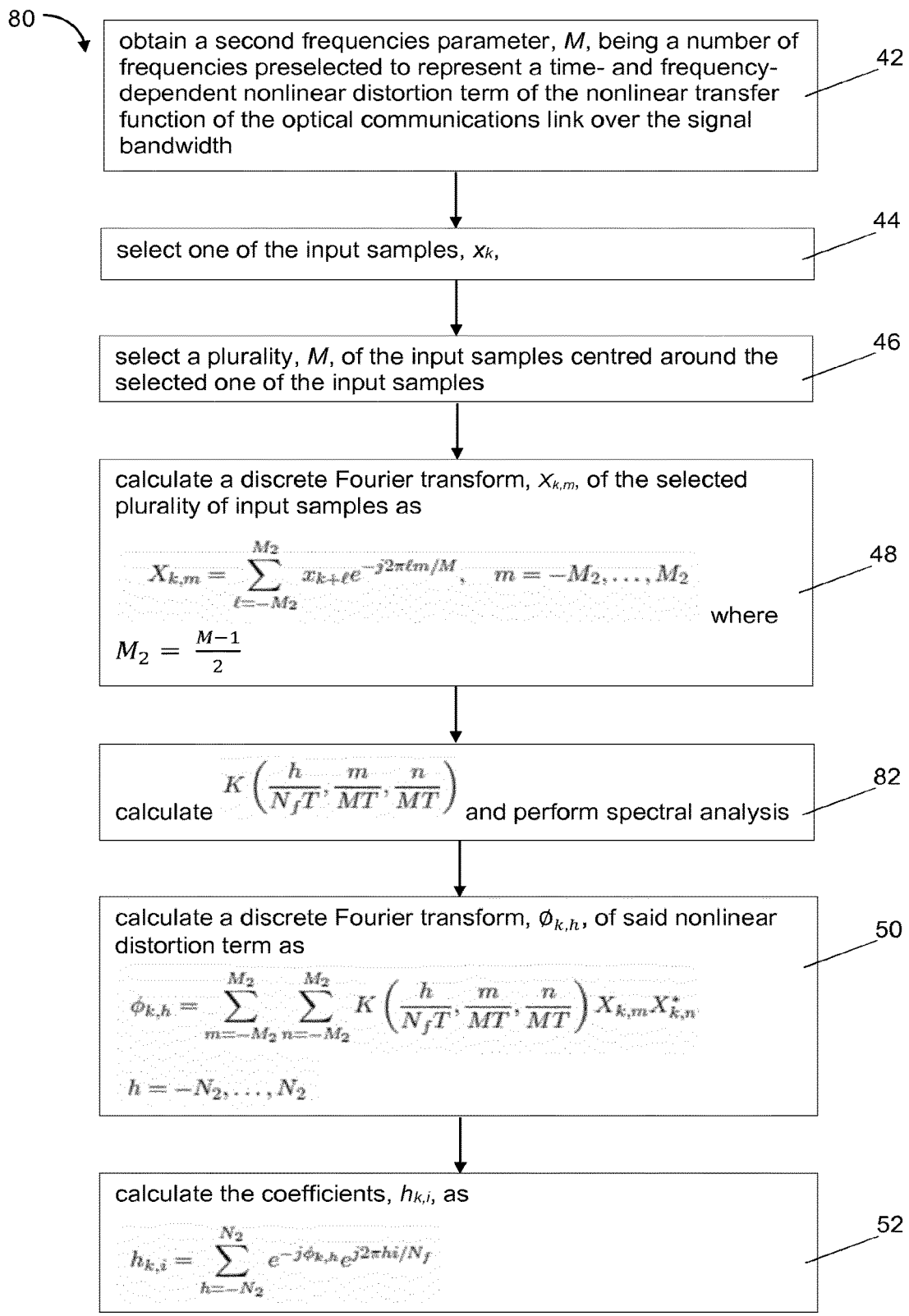
FIG. 7 shows the steps of generating coefficients, $h_{k,i}$, in a method according to a seventh embodiment of the invention of non-linear propagation impairment equalisation.

A seventh embodiment of the invention provides a method of non-linear propagation impairment equalisation which is similar to the method of the previous embodiment, with the following modifications. Details of the process 80 of generating a plurality of coefficients, $h_{k,i}$, at each sampling time, kT, of this embodiment are shown in FIG. 7.

In this embodiment, the method comprises calculating the Kernel, $K(f,\mu,\upsilon)$, and performing spectral analysis of the Kernel to identify each of the selected frequencies for which the modulus of h, m and n are above the preselected threshold value 82.

Figure 8:
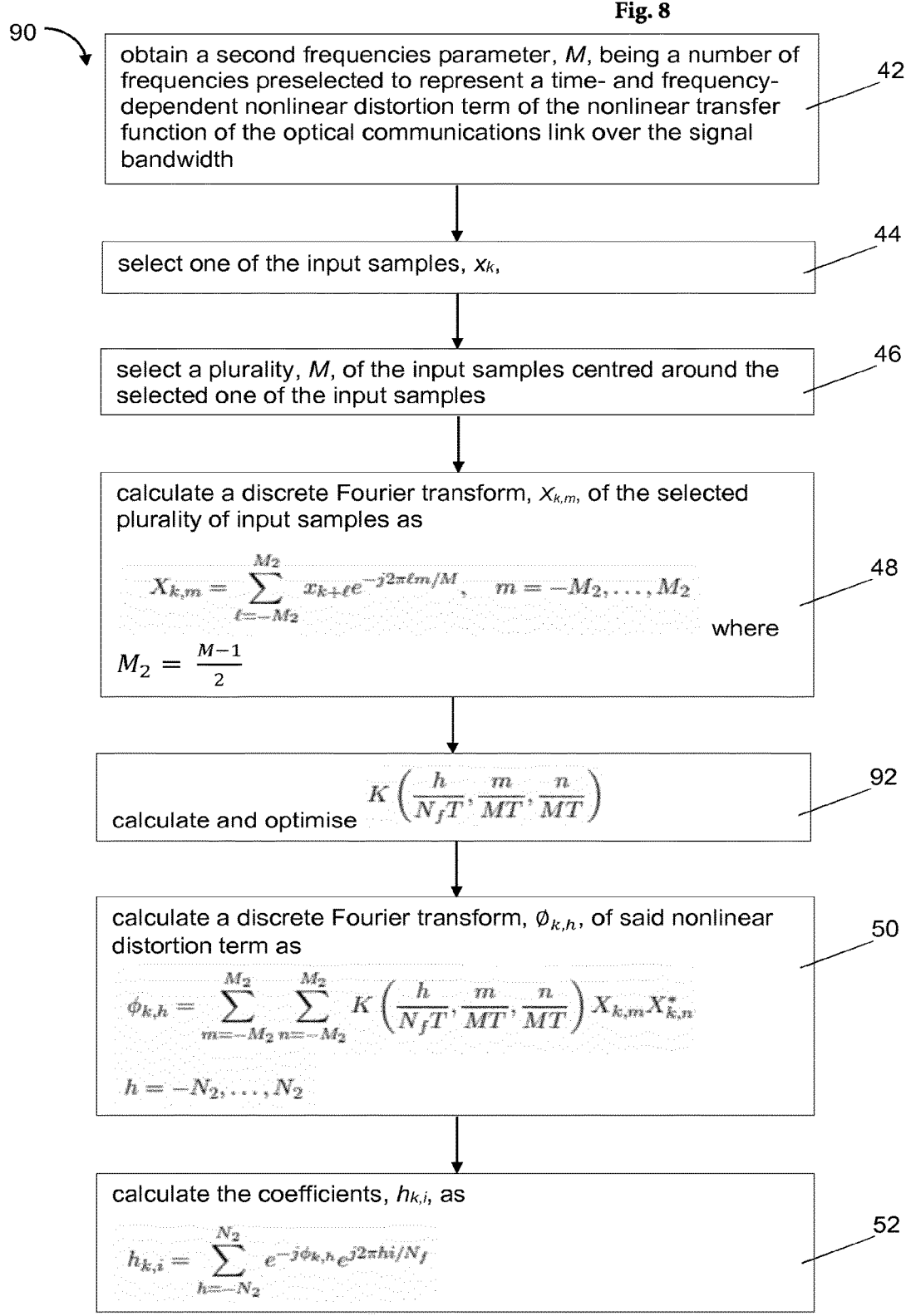
FIG. 8 shows the steps of generating coefficients, $h_{k,i}$, in a method according to an eighth embodiment of the invention of non-linear propagation impairment equalisation.

An eighth embodiment of the invention provides a method of non-linear propagation impairment equalisation which is similar to the method of the previous embodiment, with the following modifications. Details of the process 90 of generating a plurality of coefficients, $h_{k,i}$, at each sampling time, kT, of this embodiment are shown in FIG. 8.

In this embodiment, only some of the parameters of the optical fibre link are known. The method additionally comprises optimising $$K\left(\frac{h}{N_f T}, \frac{m}{MT}, \frac{n}{MT}\right)$$

using an iterative adaptive estimation algorithm, such as the gradient algorithm for the minimization of the mean square error or the stochastic gradient algorithm for the minimization of the mean square error, both of which will be well known to the skilled person.

This may enable the values of the Kernel coefficients to be initialised by calculation and then finely tuned using the iterative adaptive estimation algorithm. This embodiment may also be applied where the link parameters are not know precisely. As an alternative to calculating the Kernel, the values of $$K\left(\frac{h}{N_f T}, \frac{m}{MT}, \frac{n}{MT}\right)$$

may be estimated using a training optical communications signal which is transmitted across the optical fibre link. The training optical communications signal is sampled to obtain a training sequence of input samples, and then transmitted across the optical fibre link. Following transmission, the training optical communications signal is sampled to obtain a training sequence of output samples. The $$K\left(\frac{h}{N_f T}, \frac{m}{MT}, \frac{n}{MT}\right)$$

values are estimated from the training sequence of input samples, the training sequence of output samples and the nonlinear time-varying transfer function of the optical communications link, $H_{NL}(t,f) = e^{-j\phi(t,f)}$, where $\phi(t,f) = \int \int_{\mathbb{R}^2} K(f,\mu,\nu) U(\mu) U^*(\nu) e^{j2\pi(\mu-\nu)t} d\mu d\nu$.

Figure 9:
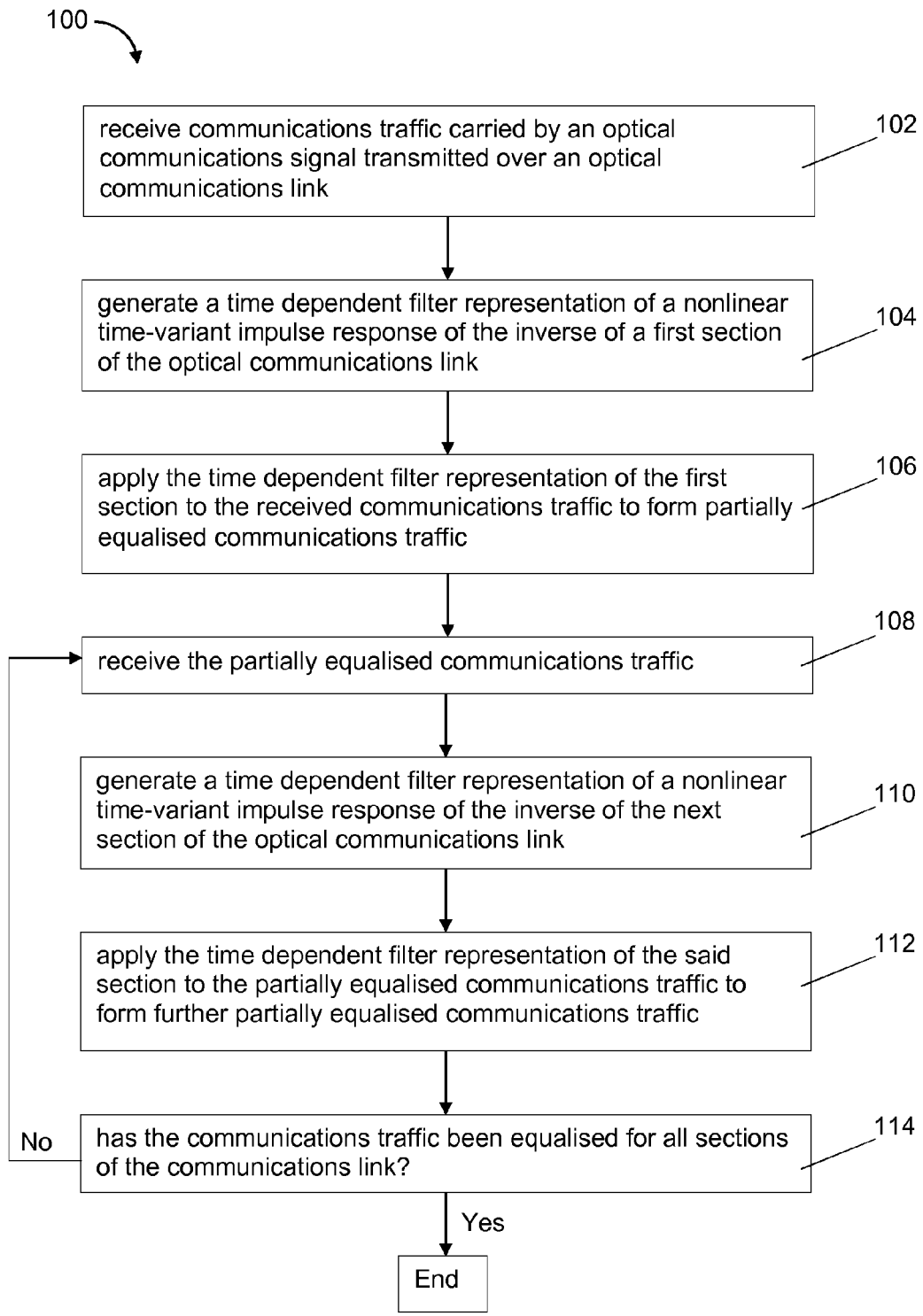
FIG. 9 shows the steps of a method according to a ninth embodiment of the invention of non-linear propagation impairment equalisation.

Referring to FIG. 9, a ninth embodiment of the invention provides a method 100 of non-linear propagation impairment equalisation having the steps shown in FIG. 9. The method 90 of this embodiment is similar to the method 10 of the first embodiment.

The optical communications link in this embodiment is treated as comprising a plurality of sections and the method 90 comprises performing non-linear propagation impairment equalisation on the received communications traffic for each section of the optical communications link, as follows. It will be appreciated that the optical communications link may not actually comprise different sections but is being treated as being divided into sections for the purposes of performing the method 90 of this embodiment.

The method 90 commences with receiving communications traffic carried by an optical communications signal transmitted over an optical communications link 102. A time dependent filter representation of a nonlinear time-variant impulse response of the inverse of a first section of the optical communications link is then generated 104. A time dependent filter representation of the first section is applied to the received communications traffic to form partially equalised communications traffic 106, which forms the received communications traffic for the next iteration of the method 108. A time dependent filter representation of a nonlinear time-variant impulse response of the inverse of the next section of the optical communications link is then generated 110 and applied to the received partially equalised communications traffic 112. The steps of receiving partially equalised communications traffic 108, generating a time dependent filter representation of a nonlinear time-variant impulse response of the inverse of the next section of the optical communications link 110 and applying it to the received partially equalised communications traffic 112 are repeated until the communications traffic has been equalised for all sections of the communications link 114.

Figure 10:
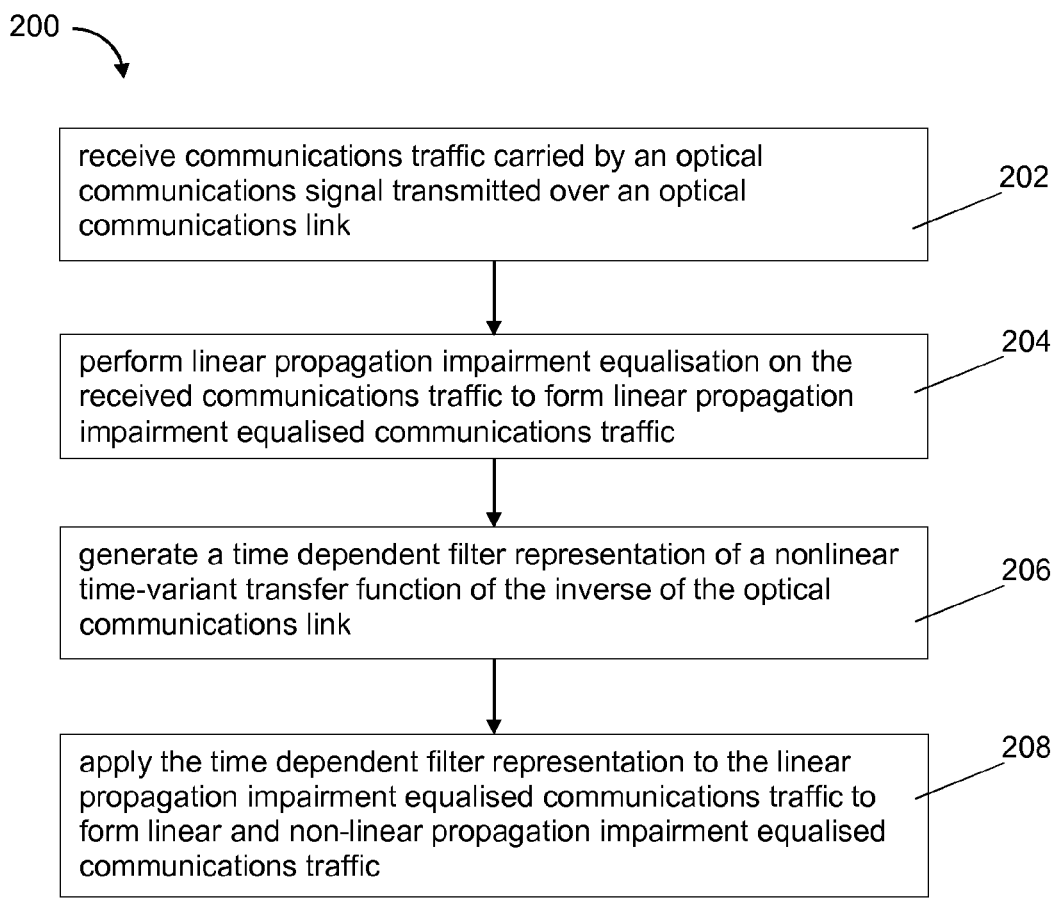
FIG. 10 shows the steps of a method according to a tenth embodiment of the invention of propagation impairment equalisation.

A tenth embodiment of the invention provides a method 200 of propagation impairment equalisation having the steps shown in FIG. 10.

The method 200 comprises receiving communications traffic carried by an optical communications signal transmitted over an optical communications link 202. Linear propagation impairment equalisation is then performed on the received communications traffic to form linear propagation impairment equalised communications traffic 204. A time dependent filter representation of a nonlinear time-variant impulse response of the inverse of the optical communications link is generated 206 and applied to the linear propagation impairment equalised communications traffic to form linear and non-linear propagation impairment equalised communications traffic 208.

Any of the methods of non-linear propagation impairment equalisation described in the previous embodiments may be used to carry out the steps of generating a time dependent filter representation of a nonlinear time-variant impulse response of the inverse of the optical communications link 206 and applying it to the linear propagation impairment equalised communications traffic to form linear and non-linear propagation impairment equalised communications traffic 208.

The linear propagation impairment equalisation may, for example, be chromatic dispersion compensation and polarisation mode dispersion compensation, or polarisation demultiplexing.

Figure 11:
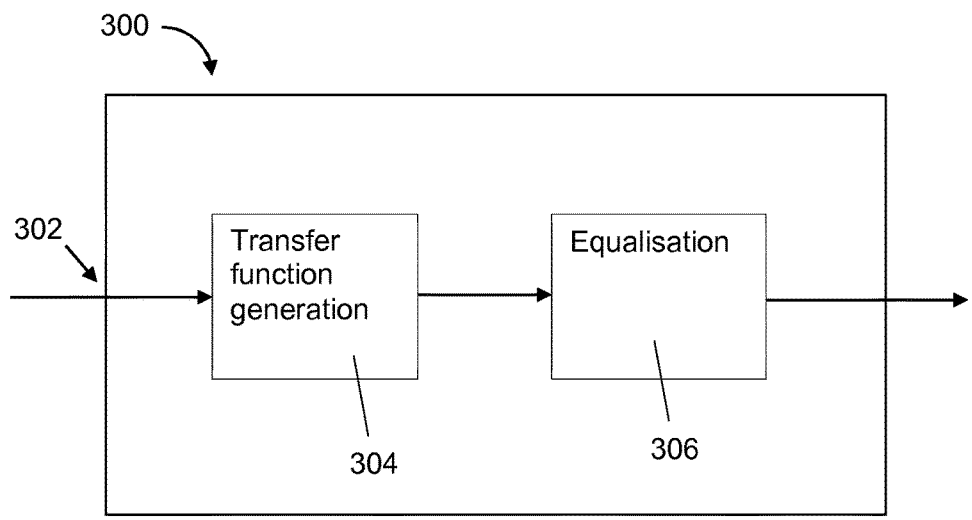
FIG. 11 is a schematic representation of an optical communications link nonlinear propagation impairment equaliser according to an eleventh embodiment of the invention.

Referring to FIG. 11, an eleventh embodiment of the invention provides an optical communications link nonlinear propagation impairment equaliser 300, comprising an input 302, transfer function generation apparatus 304 and equalisation apparatus 306.

The input 302 is arranged to receive communications traffic carried by an optical communications signal transmitted over an optical communications link. The transfer function generation apparatus 304 is arranged to generate a time dependent filter representation of a nonlinear time-variant impulse response of the inverse of the optical communications link. The equalisation apparatus 306 is arranged to apply the time dependent filter representation to the received communications traffic to form non-linear propagation impairment equalised communications traffic.

Referring again to FIG. 11, a twelfth embodiment of the invention provides an optical communications link nonlinear propagation impairment equaliser having the same general structure as the equaliser 300 of the previous embodiment. In this embodiment, the transfer function generation apparatus 304 is arranged to generate a discrete-time representation of the nonlinear time-variant impulse response of the inverse of the optical communications link using a FRLP analytical approximation of the NLSE.

Figure 12:
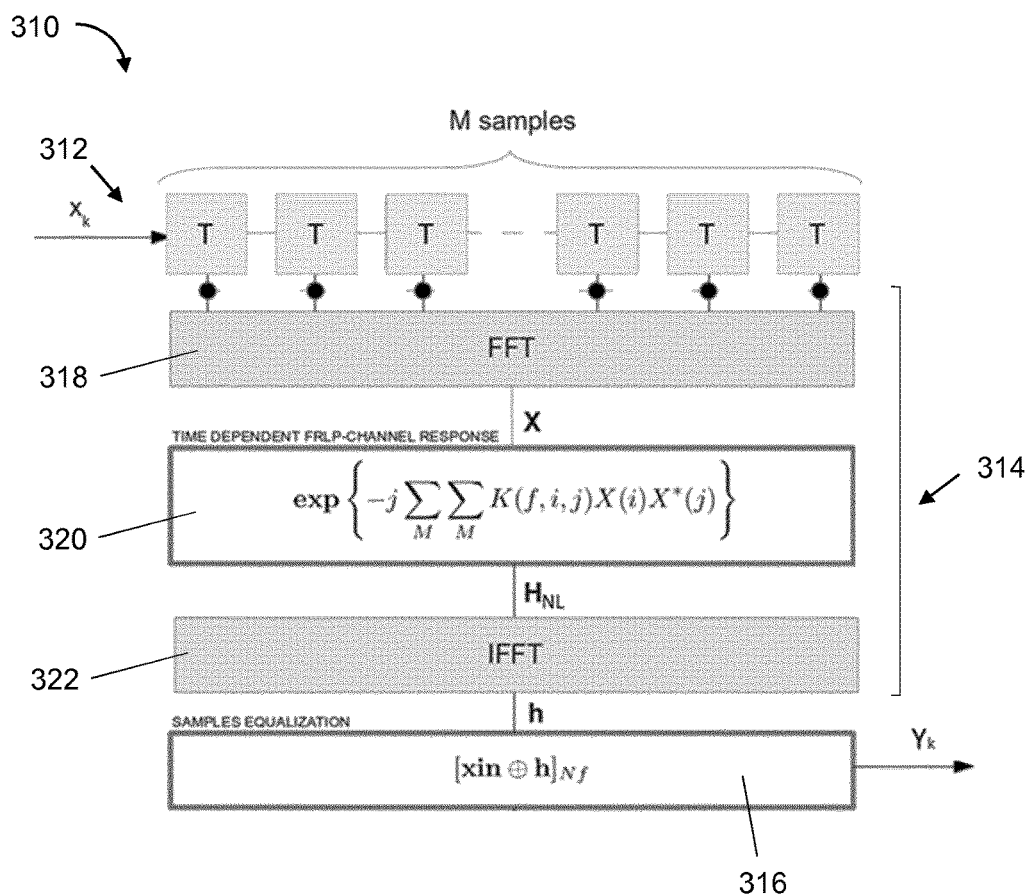
FIG. 12 is a schematic representation of an optical communications link nonlinear propagation impairment equaliser according to a thirteenth embodiment of the invention.

A thirteenth embodiment of the invention provides an optical communications link nonlinear propagation impairment equaliser 310 as illustrated schematically in FIG. 12. The equaliser 310 of this embodiment is similar to the equaliser 300 of the previous embodiment, with the following modifications.

In this embodiment, the optical communications link is an optical fibre communications link having a nonlinear transfer function. The nonlinear time-variant impulse response is a Fourier transform of the nonlinear transfer function. The optical communications signal has a signal bandwidth. The input 312 is arranged to receive a sequence of input samples, $\{x_k\}$, of the communications traffic. The input samples have a sampling rate, $1/T$, which means that the samples are separated from each other by a time interval T. Thus the k-th sample, $x_k$, is taken at time kT.

The transfer function generation apparatus 314 is arranged to, at a sampling time, kT, generate a plurality of coefficients, $h_{k,i}$, of the discrete-time representation of the nonlinear time-variant impulse response of the inverse of the optical communications link. $h_{k,i}$ is the i-th coefficient of the discrete-time representation of the nonlinear time-variant impulse response of the inverse of the optical communications link evaluated at time kT.

The equalisation apparatus 316 is arranged to obtain a first frequencies parameter, $N_f$, and to generate a sequence of equalised samples, $\{y_k\}$, from the received sequence of input samples. The first frequencies parameter, $N_f$, is a number of frequencies selected to represent the nonlinear transfer function of the optical communications link over the signal bandwidth.

The equalisation apparatus is arranged to generated each equalised sample, $y_k$, as $$y_k = \sum_{i=-N_2}^{N_2} h_{k,i} x_{k-i}, \text{ where } N_2 = \frac{N_f - 1}{2}.$$

Referring again to FIG. 12, a fourteenth embodiment of the invention provides an optical communications link nonlinear propagation impairment equaliser having the same general structure as the equaliser 310 of the previous embodiment.

The coefficients, $h_{k,i}$, depend on the input samples, $\{x_k\}$, and change with time. In this embodiment, the transfer function generation apparatus 314 is arranged to, at each sampling time, kT, generate a new set of coefficients.

The transfer function generation apparatus 314 is arranged to obtain a second frequencies parameter, M, which is a number of frequencies that has been selected to represent a time- and frequency-dependent nonlinear distortion term of the nonlinear transfer function of the optical communications link over the signal bandwidth. The transfer function generation apparatus 314 is arranged to select one of the input samples, $x_k$, and then select a plurality, M, of the input samples centred around the selected one of the input samples. A sequence of input samples, $\{x_k\}$, is thereby selected by the transfer function generation apparatus at sampling time kT.

The transfer function generation apparatus 314 is arranged to calculate a discrete Fourier transform, $X_{k,m}$, of the selected plurality of input samples as $$X_{k,m} = \sum_{\ell=-M_2}^{M_2} x_{k+\ell} e^{-j2\pi \ell m/M}, m = -M_2, \ldots, M_2,$$

$$\text{where } M_2 = \frac{M-1}{2}.$$

The transfer function generation apparatus 314 is additionally arranged to calculate a discrete Fourier transform, $\emptyset_{k,h}$, of the nonlinear distortion term as $$\phi_{k,h} = \sum_{m=-M_2}^{M_2} \sum_{n=-M_2}^{M_2} K\left(\frac{h}{N_f T}, \frac{m}{MT}, \frac{n}{MT}\right) X_{k,m} X_{k,n}^*,$$

-continued $$h = -N_2, \ldots, N_2, \text{ where } K\left(\frac{h}{N_f T}, \frac{m}{MT}, \frac{n}{MT}\right)$$

is the Fourier transform of a Kernel function, $K(f,\mu,\upsilon)$, that accounts for a nonlinear interaction efficiency between different frequency components and depends on characteristics of the optical fibre communications link. The Kernel function is:

$$K(f,\mu,\nu) = H_0(L,\mu-\nu+f)H_0^*(L,f) \times \int_0^L \gamma(z)\alpha_u(z)H_0(z,\mu) \\ H_0^*(z,\nu)H_0(z,f)H_0^*(z,\mu-\nu+f)dz$$

in which $H_0(z,f) \triangleq \exp(-j2\pi^2 f^2 \int_0^z \beta_2(\xi)d\xi)$ is a linear transfer function of the optical communications link.

The transfer function generation apparatus 314 is arranged to calculate the coefficients, $h_{k,i}$, as $$h_{k,i} = \sum_{h=-N_2}^{N_2} e^{-j\phi_{k,h}} e^{j2\pi h i/N_f}.$$

The transfer function generation apparatus 314 may be arranged to calculate each of the Fourier transforms and inverse Fourier transforms using a fast Fourier transform, FFT, algorithm 318, 322, which will be well known to the skilled person. If the first frequencies parameter, $N_f$, is selected to be 1, i.e. a single frequency within the signal bandwidth is used to represent the nonlinear transfer function of the optical communications link over the whole signal bandwidth, then $$y_k = \sum_{i=-N_2}^{N_2} h_{k,i} x_{k-i}$$

reduces to a simple multiplication of the input sample, $x_k$, taken at sampling time kT multiplied by the coefficient $h_{k,0}$, which is readily evaluated as $h_{k,0} = e^{-j\phi_{k,0}}$.

The computational complexity per each equalised sample scales as $N_f M^2$. A convenient trade-off between the performance of the equaliser and the computational complexity can be achieved by properly selecting $N_f$ and M.

Figure 13:
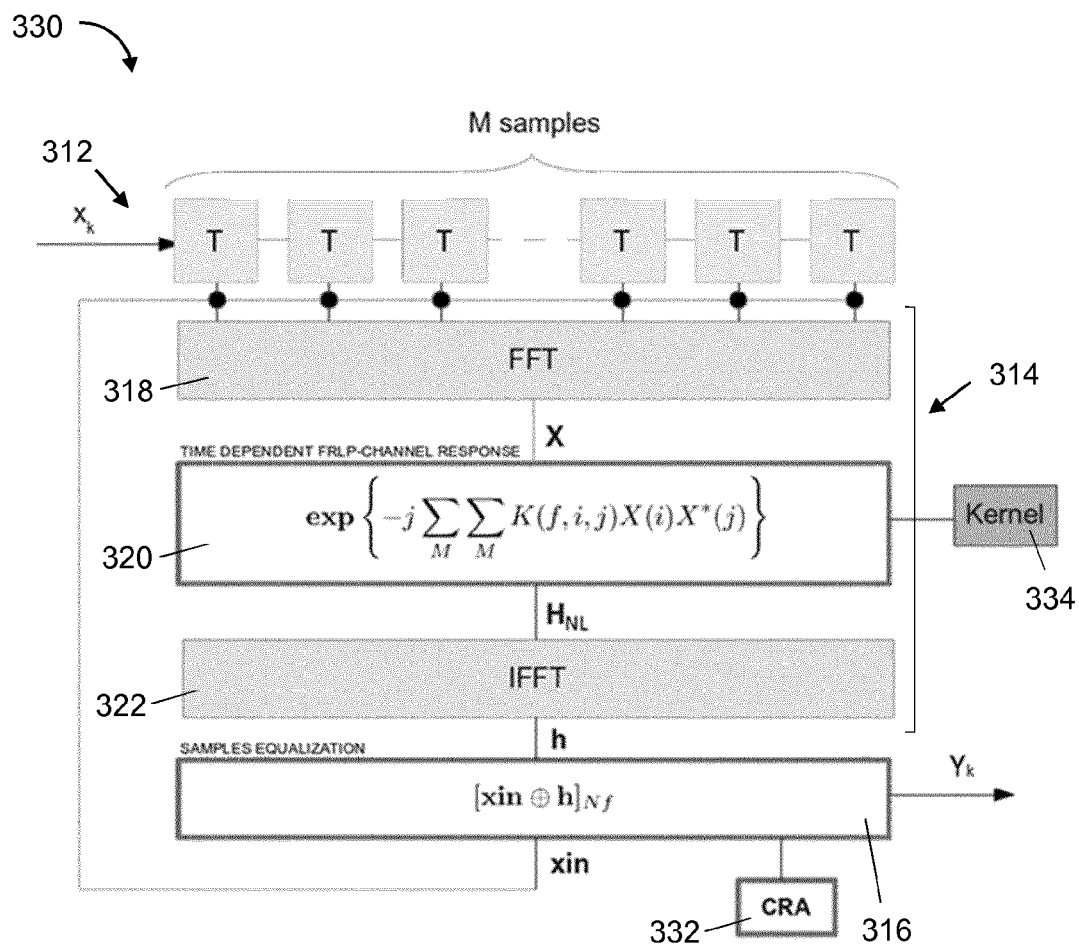
FIG. 13 is a schematic representation of an optical communications link nonlinear propagation impairment equaliser according to a fifteenth embodiment of the invention.
Figure 14:
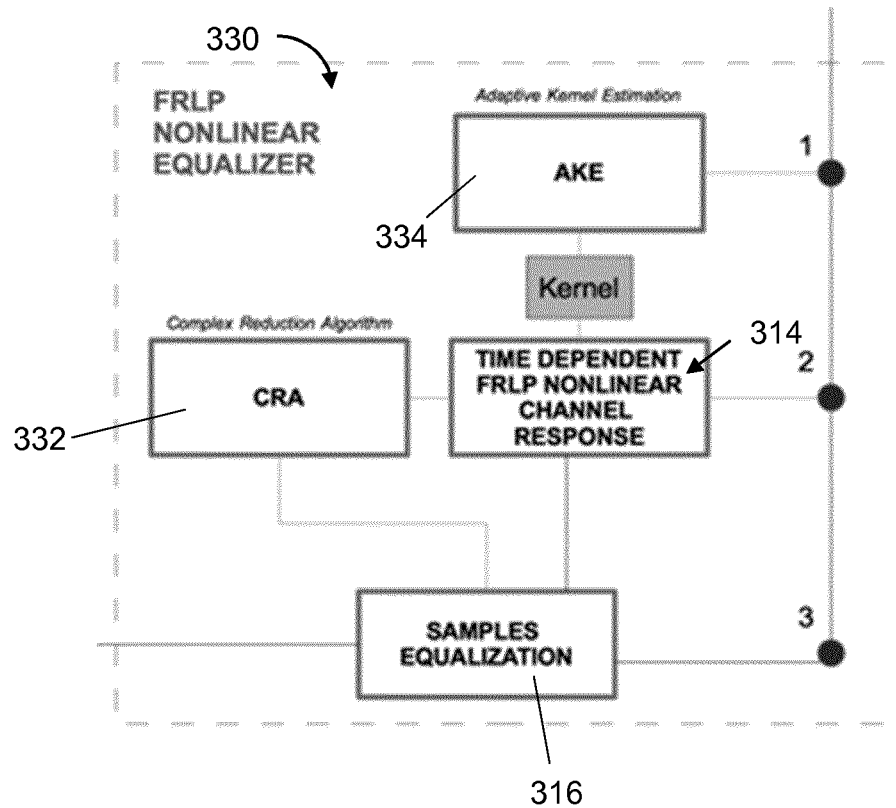
FIG. 14 is a further schematic representation of the optical communications link nonlinear propagation impairment equaliser shown in FIG. 13.

A fifteenth embodiment of the invention provides an optical communications link nonlinear propagation impairment equaliser 330 as shown in FIGS. 13 and 14. The equaliser 330 of this embodiment is similar to the equaliser 310 of the previous embodiment, with the following modifications.

The optical fibre link has a plurality of link parameters: a length, L; a group velocity dispersion, $\beta_2(z)$; a nonlinear coefficient, $\gamma(z)$; and a normalised power profile, $$a_u = \frac{P_u(z)}{P_u(0)}.$$

$P_u$ is the optical power of the optical communications signal. The inverse of the optical fibre link has a plurality of link parameters: the same length, L; a group velocity dispersion parameter, $\beta'_2(z) = -\beta_2(L-z)$; a nonlinear coefficient, $\gamma'(z) = -\gamma(L-z)$; and a normalised power profile, $\alpha'_u(z) = \alpha_u(L-z)$.

The equaliser 330 of this embodiment additionally comprises adaptive Kernel estimation apparatus 334. The adaptive Kernel estimation apparatus is arranged to estimate $$K\left(\frac{h}{N_f T}, \frac{m}{MT}, \frac{n}{MT}\right)$$

using the Kernel function, $K(f,\mu,\upsilon)$, which is given by $$K(f,\mu,\nu) = H_0(L,\mu-\nu+f)H_0^*(L,f) \times \int_0^L \gamma(z)\alpha_u(z)H_0(z,\mu) \\ H_0^*(z,\nu)H_0(z,f)H_0^*(z,\mu-\nu+f)dz$$

$H_0(z,f) \triangleq \exp(-j2\pi^2 f^2 \int_0^z \beta_2(\xi)d\xi)$ is a linear transfer function of the optical fibre link. The adaptive Kernel estimation apparatus is arranged to provide the estimated $$K\left(\frac{h}{N_f T}, \frac{m}{MT}, \frac{n}{MT}\right)$$

to the transfer function generation apparatus 320.

Where only some of the optical fibre link parameters are known or the link parameters are not know precisely, the adaptive Kernel estimation apparatus 334 may be arranged to optimise $$K\left(\frac{h}{N_f T}, \frac{m}{MT}, \frac{n}{MT}\right)$$

using an iterative adaptive estimation algorithm, such as the gradient algorithm for the minimization of the mean square error or the stochastic gradient algorithm for the minimization of the mean square error.

In this embodiment, the equaliser 330 additionally comprises complexity reduction apparatus 332 arranged to select a subset of the selected frequencies, M. The equalisation apparatus 316 is arranged to use the respective $$K\left(\frac{h}{N_f T}, \frac{m}{MT}, \frac{n}{MT}\right)$$

of only the subset of the selected frequencies.

A sixteenth embodiment of the invention provides an optical communications link nonlinear propagation impairment equaliser which is similar to the equaliser 330 shown in FIGS. 13 and 14. The equaliser of this embodiment will be described with reference to FIGS. 13 and 14.

In this embodiment, the subset selected by the complexity reduction apparatus 332 consists of each of the selected frequencies for which the modulus of h, m and n are above a preselected threshold value. The subset may consist of a predefined number of frequencies.

A seventeenth embodiment of the invention provides an optical communications link nonlinear propagation impairment equaliser which is similar to the equaliser 330 shown in FIGS. 13 and 14. The equaliser of this embodiment will be described with reference to FIGS. 13 and 14.

In this embodiment, the adaptive Kernel estimation apparatus 334 is arranged to calculate the Kernel, $K(f,\mu,\upsilon)$, and to perform spectral analysis of the Kernel to identify each of the selected frequencies for which the modulus of h, m and n are above a preselected threshold value.

An eighteenth embodiment of the invention provides an optical communications link nonlinear propagation impairment equaliser which is similar to the equaliser 330 shown in FIGS. 13 and 14. The equaliser of this embodiment will be described with reference to FIGS. 13 and 14.

In this embodiment, the adaptive Kernel estimation apparatus 334 is arranged to receive a training sequence of input samples and a training sequence of output samples. The adaptive Kernel estimation apparatus is arranged to estimate $$K\left(\frac{h}{N_fT}, \frac{m}{MT}, \frac{n}{MT}\right)$$

from the training sequence of input samples, the training sequence of output samples and the nonlinear transfer function of the optical communications link, $H_{NL}(t,f)=e^{-j\phi(t,f)}$, where $\phi(t,f)=\int\int_{\mathbb{R}^2} K(f,\mu,\nu)U(\mu)U^*(\nu)e^{j2\pi(\mu-\nu)t}d\mu d\nu$. The adaptive Kernel estimation apparatus is arranged to optimise the estimated $$K\left(\frac{h}{N_fT}, \frac{m}{MT}, \frac{n}{MT}\right)$$

using an iterative adaptive estimation algorithm.

Figure 15A:
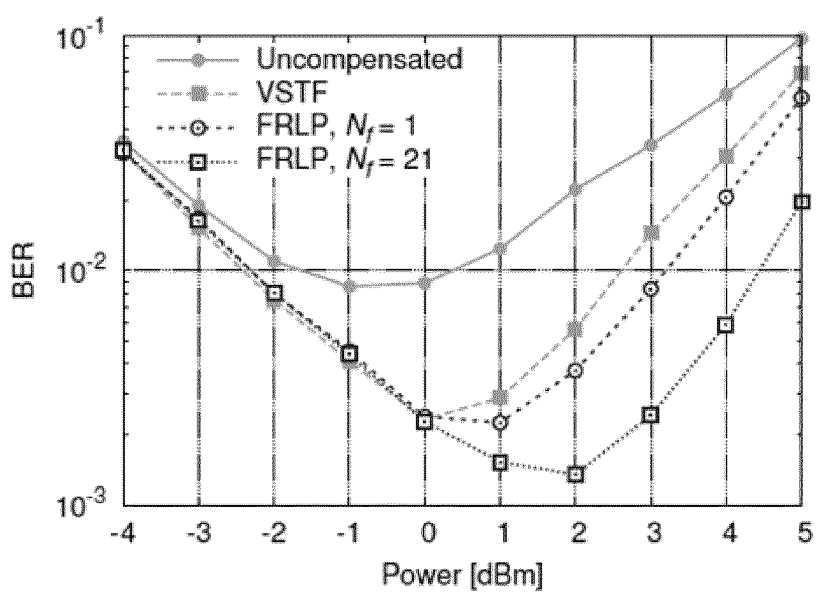
FIG. 15(a) shows Bit error rate, BER, as a function of optical communications signal launch power for: no non-linear compensation applied (solid dots); nonlinear equalisation applied using Volterra series transfer function, VSTF, (solid squares); and nonlinear equalisation applied using the nonlinear equaliser show in FIGS. 13 and 14, for $N_f=1$ (open circles) and $N_f=21$ (open squares), for a dispersion compensated optical communications link.
Figure 15B:
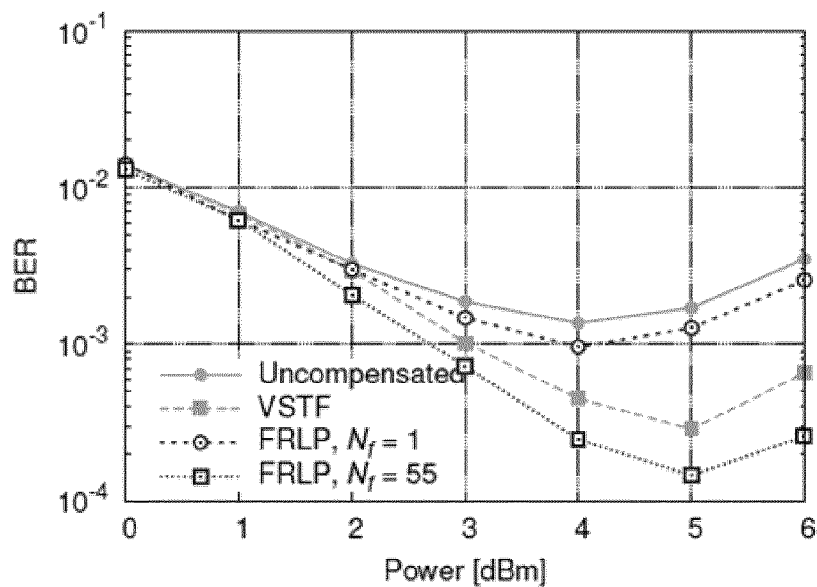
FIG. 15(b) shows Bit error rate, BER, as a function of optical communications signal launch power for: no non-linear compensation applied (solid dots); nonlinear equalisation applied using Volterra series transfer function, VSTF, (solid squares); and nonlinear equalisation applied using the nonlinear equaliser show in FIGS. 13 and 14, for $N_f=1$ (open circles) and $N_f=55$ (open squares), for an optical communications link without dispersion compensation.
Figure 16:
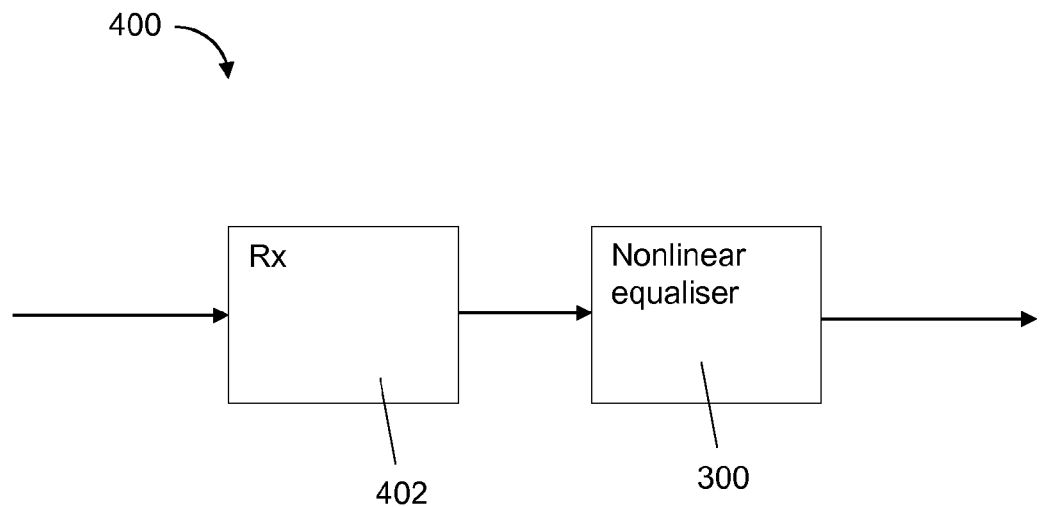
FIG. 16 is a schematic representation of an optical communications signal receiver apparatus according to a nineteenth embodiment of the invention.

Referring to FIG. 15(a) and FIG. 15(b), the performance of the nonlinear equaliser 330 shown in FIGS. 13 and 14 was compared to a nonlinear equaliser arranged to perform nonlinear equalisation using the Volterra series transfer function, VSTF.

FIG. 15(a) shows the results for a single mode fibre, SMF, communications link formed of seventeen 120 km long sections of dispersion managed SMF. The nonlinear equaliser 330 was configured to have M=32. FIG. 15(a) shows bit error rate, BER, as a function of optical communications signal launch power for the following four different nonlinear equalisation scenarios: no nonlinear compensation applied (solid dots); nonlinear equalisation applied using VSTF (solid squares); and nonlinear equalisation applied using the nonlinear equaliser 330 configured for $N_f$=1 (open circles) and $N_f$=21 (open squares).

FIG. 15(b) shows the results for a communications link formed of five 100 km long sections of SMF which were not dispersion managed. The nonlinear equaliser 330 was configured to have M=64. FIG. 15(b) shows bit error rate, BER, as a function of optical communications signal launch power for the following four different nonlinear equalisation scenarios: no nonlinear compensation applied (solid dots); nonlinear equalisation applied using VSTF (solid squares); and nonlinear equalisation applied using the nonlinear equaliser 330 configured for $N_f$=1 (open circles) and $N_f$=55 (open squares).

It can be seen that, in both cases, the nonlinear equalizer 330 of FIGS. 13 and 14 achieves a lower BER than the VSTF based nonlinear equalizer, and has a lower complexity. Moreover, in the dispersion compensated fibre link, the performance of the nonlinear equalizer 330 is slightly better than that of the VSTF based nonlinear equaliser even for $N_f$=1, and the nonlinear equaliser 330 has a significantly lower complexity than the VSTF based nonlinear equaliser.

Referring to FIG. 14, a nineteenth embodiment of the invention provides optical communications signal receiver apparatus 400 comprising an optical receiver 402 and an optical communications link nonlinear propagation impairment equaliser 300 as shown in FIG. 11.

The optical receiver 402 is arranged to receive an optical communications signal from an optical communications link. The optical communications signal carrying communications traffic.

The optical communications link nonlinear propagation impairment equaliser is arranged to receive communications traffic from the optical receiver.

It will be appreciated that any of the nonlinear equalisers 310, 330 described with reference to FIGS. 12 to 14 may alternatively be used.

Figure 17:
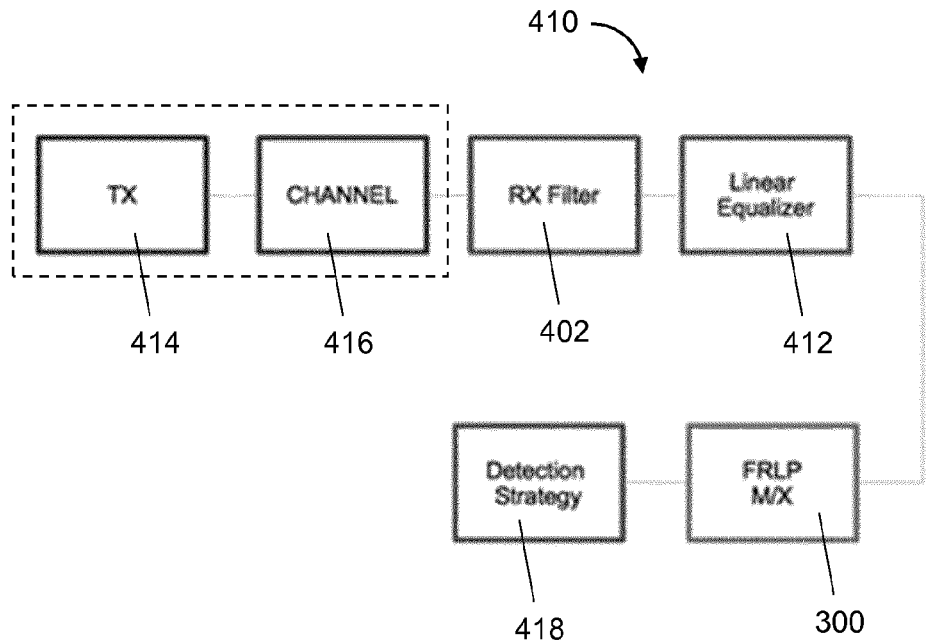
FIG. 17 is a schematic representation of an optical communications signal receiver apparatus according to a twentieth embodiment of the invention.

A twentieth embodiment of the invention provides optical communications signal receiver apparatus 410 as shown in FIG. 17. The receiver apparatus 410 of this embodiment is similar to the receiver apparatus 400 of the previous embodiment with the following modifications. The same reference numbers are retained for corresponding features.

In this embodiment, the receiver apparatus 410 additionally comprises an optical communications link linear propagation impairment equaliser 412 and detection apparatus 418.

The linear equaliser 412 is arranged to receive communications traffic from the optical receiver 402 and is arranged to perform linear propagation impairment equalisation on the received communications traffic to form linear propagation impairment equalised communications traffic. The nonlinear equaliser 300 is arranged to receive the linear propagation impairment equalised communications traffic from the linear equaliser 412 and is arranged to perform nonlinear propagation impairment equalisation on the linear propagation impairment equalised communications traffic to form linear and non-linear propagation impairment equalised communications traffic.

For completeness, FIG. 17 also shows a transmitter 414 and the optical fibre communications link 416, neither of which form part of this embodiment.

Figure 18:
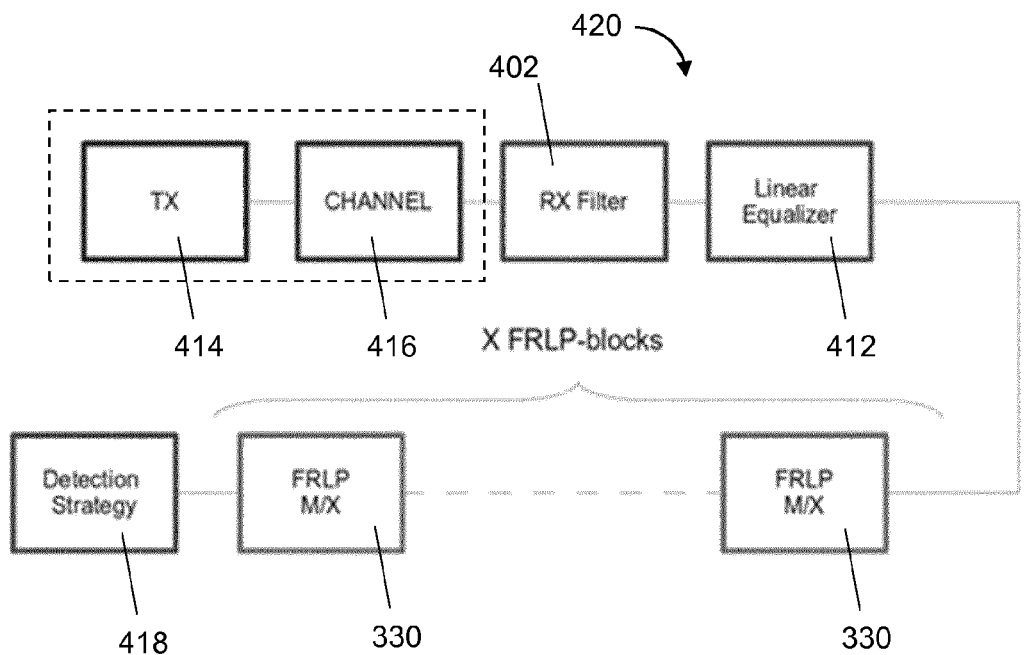
FIG. 18 is a schematic representation of an optical communications signal receiver apparatus according to a twenty-first embodiment of the invention.

A twenty-first embodiment of the invention provides optical communications signal receiver apparatus 420 as shown in FIG. 18. The receiver apparatus 420 of this embodiment is similar to the receiver apparatus 410 of the previous embodiment with the following modifications. The same reference numbers are retained for corresponding features.

In this embodiment, the optical communications link 416 is treated as comprising a plurality of sections. The receiver apparatus 420 comprises a corresponding plurality of nonlinear equalisers 330, as described with reference to FIGS. 13 and 14. Each nonlinear equaliser 330 is configured to perform equalisation of the nonlinear propagation impairment associated with a respective one of the sections of the optical communications link.

The invention claimed is:

1. A method of non-linear propagation impairment equalization, the method comprising the steps of:
   a. receiving communications traffic carried by an optical communications signal transmitted over an optical communications link;
   b. generating a time dependent filter representation of a nonlinear time-variant impulse response of the inverse of the optical communications link by generating a discrete-time representation of the nonlinear time-variant impulse response of the inverse of the optical communications link using a frequency resolved log perturbation analytical approximation of the nonlinear Schrödinger equation; and c. applying the time dependent filter representation to the received communications traffic to form non-linear propagation impairment equalized communications traffic.

2. A method as claimed in claim 1, wherein:

step a. additionally comprises sampling the optical communications signal at a sampling rate, 1/T, to obtain a sequence of input samples, $\{x_k\}$, of the communications traffic;

step b. comprises, at a sampling time, kT, generating a plurality of coefficients, $h_{k,i}$, of the discrete-time representation of the nonlinear time-variant impulse response of the inverse of the optical communications link;

the optical communications signal has a signal bandwidth and the optical communications link has a nonlinear transfer function, and the nonlinear time-variant impulse response is a Fourier transform of said nonlinear transfer function; and step c. comprises obtaining a first frequencies parameter, $N_f$, being a number of frequencies selected to represent the nonlinear transfer function of the optical communications link over the signal bandwidth, and step c. comprises generating a sequence of equalized samples, $\{y_k\}$, from the sequence of input samples, each equalized sample, $y_k$, being generated as $$y_k = \sum_{i=-N_2}^{N_2} h_{k,i} x_{k-i},$$

where $N_2=(N_f-1)/2$.

3. A method as claimed in claim 2, wherein the coefficients, $h_{k,i}$ are generated by:

obtaining a second frequencies parameter, M, being a number of frequencies selected to represent a time- and frequency-dependent nonlinear distortion term of the nonlinear transfer function of the optical communications link over the signal bandwidth;

selecting one of the input samples, $x_k$, and then selecting a plurality, M, of the input samples centered around the selected one of the input samples;

calculating a discrete Fourier transform, $X_{k,m}$, of the selected plurality of input samples as $$X_{k,m} = \sum_{\ell=-M_2}^{M_2} x_{k+\ell} e^{-j2\pi\ell/M}, m = -M_2, \ldots M_2,$$

where $M_2=(M-1)/2$; calculating a discrete Fourier transform $\varnothing_{k,h}$, of said nonlinear distortion term as $$\phi_{k,h} = \sum_{m=-M_2}^{M_2} \sum_{n=M_2}^{M_2} K\left(\frac{h}{N_f T}, \frac{m}{MT}, \frac{n}{MT}\right) X_{k,m} X_{k,n}^*, h = -N_2, \ldots N_2$$

where $K\left(\frac{h}{N_f T}, \frac{m}{MT}, \frac{n}{MT}\right)$ is the Fourier transform of a Kernel function, $K(f,\mu,\upsilon)$, that accounts for a nonlinear interaction efficiency between different frequency components; and calculating the coefficients, $h_{k,i}$, as $$h_{k,i} = \sum_{h=-N_2}^{N_2} e^{-j\phi_{k,h}} e^{j2\pi hi/N_f}.$$

4. A method as claimed in claim 3, further comprising using the respective $$K\left(\frac{h}{N_f T}, \frac{m}{MT}, \frac{n}{MT}\right)$$

of only a subset of the selected frequencies, M.

5. A method as claimed in claim 4, wherein the subset consists of each of the selected frequencies for which the modulus of h, m and n are above a preselected threshold value.

6. A method as claimed in claim 3, wherein the optical communications link has a plurality of link parameters comprising a length, L, a group velocity dispersion, $\beta^2(z)$, a nonlinear coefficient, $\gamma(z)$, and a normalized power profile, $=a_u=P_u(Z)/P_u(O)$, where $P_u$ is the optical power of the optical communications signal, and the inverse of the optical communications link has the same length, L, a group velocity dispersion parameter, $\beta'_2(z)=-\beta_2(L-z)$, a nonlinear coefficient, $\gamma'(z)=-\gamma(L-z)$, and a normalized power profile, $a'_u(z)=a_u(L-z)$, and $$K\left(\frac{h}{N_f T}, \frac{m}{MT}, \frac{n}{MT}\right)$$

is calculated using $$K(f,\mu,\nu)=H_0(L,\mu-\nu+f)H_0^*(L,f)\times\int_0^L\gamma(z)\alpha_u(z)H_0(z,\mu)$$
$$H_0^*(z,\nu)H_0(z,f)H_0^*(z,\mu-\nu+f)dz$$

in which $$H_0(z, f) \stackrel{\Delta}{=} \exp\left(-j2\pi^2 f^2 \int_0^z \beta_2(\xi) d\xi\right)$$

is a linear transfer function of the optical communications link.

7. A method as claimed in claim 1, wherein the optical communications link is treated as comprising a plurality of sections and steps b. and c. are applied to each section sequentially to equalize the non-linear propagation impairment associated with each section.

8. A method of propagation impairment equalization comprising:

receiving communications traffic carried by an optical communications signal transmitted over an optical communications link;

performing linear propagation impairment equalization on the received communications traffic to form linear propagation impairment equalized communications traffic; and performing non-linear propagation impairment equalization on the linear propagation impairment equalized communications traffic according to the method of claim 1, to form linear and non-linear propagation impairment equalized communications traffic.

9. A non-transitory data carrier having computer readable instructions embodied therein, the said computer readable instructions being for providing access to resources available on a processor and the computer readable instructions comprising instructions to cause the processor to perform any of the steps of the method of non-linear propagation impairment equalization as claimed in claim 1.

10. An optical communications link nonlinear propagation impairment equalizer comprising:
   an input arranged to receive communications traffic carried by an optical communications signal transmitted over an optical communications link;
   transfer function generation apparatus arranged to generate a time dependent filter representation of a nonlinear time-variant impulse response of the inverse of the optical communications link by generating a discrete-time representation of the nonlinear time-variant impulse response of the inverse of the optical communications link using a frequency resolved log perturbation analytical approximation of the nonlinear Schrödinger equation; and
   equalization apparatus arranged to apply the time dependent filter representation to the received communications traffic to form non-linear propagation impairment equalized communications traffic.

11. An optical communications link nonlinear propagation impairment equalizer as claimed in claim 10, wherein the optical communications signal has a signal bandwidth and the optical communications link has a nonlinear transfer function, and the nonlinear time-variant impulse response is a Fourier transform of said nonlinear transfer function, and wherein:
   the input is arranged to receive a sequence of input samples, $\{x_k\}$, of the communications traffic, the input samples having a sampling rate, $1/T$;
   the transfer function generation apparatus is arranged to, at a sampling time, $kT$, generate a plurality of coefficients, $h_{k,i}$, of the discrete-time representation of the nonlinear time-variant impulse response of the inverse of the optical communications link; and
   the equalization apparatus is arranged to obtain a first frequencies parameter, $N_f$, being a number of frequencies selected to represent the nonlinear transfer function of the optical communications link over the signal bandwidth, and is arranged to generate a sequence of equalized samples, $\{y_k\}$, from the sequence of input samples,
   each equalized sample, $y_k$, being generated as $$y_k = \sum_{i=-N_2}^{N_2} h_{k,i} x_{k-i},$$

where $N_2 = (N_f - 1)/2$.

12. An optical communications link nonlinear propagation impairment equalizer as claimed in claim 11, wherein the transfer function generation apparatus is arranged to:
   obtain a second frequencies parameter, M, being a number of frequencies selected to represent a time- and frequency-dependent nonlinear distortion term of the nonlinear transfer function of the optical communications link over the signal bandwidth;
   select one of the input samples, $x_k$, and then select a plurality, M, of the input samples centered around the selected one of the input samples;
   calculate a discrete Fourier transform, $X_{k,m}$, of the selected plurality of input samples as $$X_{k,m} = \sum_{\ell=-M_2}^{M_2} x_{k+\ell} e^{-j2\pi\ell/M}, m = -M_2, \ldots M_2,$$

where $M_2 = (M-1)/2$,
   calculate a discrete Fourier transform, $\varnothing$, of said nonlinear distortion term as $$\phi_{k,h} = \sum_{m=-M_2}^{M_2} \sum_{n=M_2}^{M_2} K\left(\frac{h}{N_f T}, \frac{m}{MT}, \frac{n}{MT}\right) X_{k,m} X_{k,n}^*, h = -N_2, \ldots N_2$$

where $K\left(\frac{h}{N_f T}, \frac{m}{MT}, \frac{n}{MT}\right)$ is the Fourier transform of a Kernel function, $K(f, \mu, \upsilon)$, that accounts for a nonlinear interaction efficiency between different frequency components; and calculate the coefficients, $H_{k,i}$, as $$h_{k,i} = \sum_{h=-N_2}^{N_2} e^{-j\phi_{k,h}} e^{j2\pi h i/N_f}.$$

13. An optical communications link nonlinear propagation impairment equalizer as claimed in claim 12, further comprising complexity reduction apparatus arranged to select a subset of the selected frequencies, M, and wherein the transfer function generation apparatus is arranged to use the respective $$K\left(\frac{h}{N_f T}, \frac{m}{MT}, \frac{n}{MT}\right)$$

of only said subset of the selected frequencies.

14. An optical communications link nonlinear propagation impairment equalizer as claimed in claim 13, wherein the subset consists of each of the selected frequencies for which the modulus of h, m and n are above a preselected threshold value.

15. An optical communications link nonlinear propagation impairment equalizer as claimed in claim 12, wherein the optical communications link has a plurality of link parameters comprising a length, L, a group velocity dispersion, GVD, $\beta_2(z)$, a nonlinear coefficient, $\gamma(z)$, and a normalized power profile, =( )/( ), and the inverse of the optical communications link has the same length, L, a GVD parameter, $\beta_2'(z) = -\beta_2(L-z)$, a nonlinear coefficient, $\gamma'(z) = -\gamma(L-z)$, and a normalized power profile, $a'_u(z) = a_u(L-z)$, and wherein the nonlinear equalizer further comprises adaptive Kernel estimation apparatus arranged to estimate $$K\left(\frac{h}{N_f T}, \frac{m}{MT}, \frac{n}{MT}\right)$$

using $K(f,\mu,\nu) = H_0(L,\mu-\nu+f)H_0^*(L,f) \times \int_0^L \gamma(z)\alpha_u(z)H_0(z,\mu)H_0^*(z,\nu)H_0(z,f)H_0^*(z,\mu-\nu+f)dz$ in which $H_0(z,f) \triangleq \exp$ $(-j2\pi^2 f^2 \int_0^z \beta_2(\xi)d\xi)$ is a linear transfer function of the optical communications link and arranged to provide the estimated $$K\left(\frac{h}{N_f T}, \frac{m}{MT}, \frac{n}{MT}\right)$$

to the transfer function generation apparatus.

16. An optical communications link nonlinear propagation impairment equalizer as claimed in claim 10, and comprising a plurality of sets of transfer function generation apparatus and equalization apparatus, the transfer function apparatus and the equalization apparatus sets being arranged sequentially, wherein in each set the transfer function generation apparatus is arranged to generate a time dependent filter representation of a nonlinear time-variant impulse response of the inverse of a respective section of the optical communications link and the equalization apparatus is arranged to apply the time dependent filter representation to the communications traffic received by the said set to form partially non-linear propagation impairment equalized communications traffic.

17. Optical communications signal receiver apparatus comprising:

an optical receiver arranged to receive an optical communications signal from an optical communications link, the optical communications signal carrying communications traffic; and an optical communications link nonlinear propagation impairment eequalizer equalizer as claimed in claim 10, and arranged to receive communications traffic from the optical receiver.

18. Optical communications signal receiver apparatus as claimed in claim 17, further comprising an optical communications link linear propagation impairment equalizer arranged to receive communications traffic from the optical receiver, and wherein the optical communications link nonlinear propagation impairment equalizer is arranged to receive linear propagation impairment equalized communications traffic from the optical communications link linear propagation impairment equalizer.

* * * * *